US012750633B2

(12) United States Patent
de Vicente Peña et al.

(10) Patent No.: US 12,750,633 B2
(45) Date of Patent: Sep. 29, 2026

(54) MINIMIZING ECHO CAUSED BY STEREO AUDIO VIA POSITION-SENSITIVE ACOUSTIC ECHO CANCELLATION

(71) Applicant: Google LLC, Mountain View, CA (US)

(72) Inventors: Jesús de Vicente Peña, Stockholm (SE); Joseph Gilles Desloge, San Francisco, CA (US); Per Tomas Erik Åhgren, Knivsta (SE)

(73) Assignee: GOOGLE LLC, Mountain View, CA (US)

( * ) Notice: Subject to any disclaimer, the term of this patent is extended or adjusted under 35 U.S.C. 154(b) by 458 days.

(21) Appl. No.: 18/297,299

(22) Filed: Apr. 7, 2023

(65) Prior Publication Data

US 2024/0340608 A1 Oct. 10, 2024

(51) Int. Cl.
*H04S 7/00* (2006.01)
*H04S 1/00* (2006.01)

(52) U.S. Cl.
CPC .............. *H04S 7/305* (2013.01); *H04S 1/007* (2013.01); *H04S 7/303* (2013.01); *H04S 2400/11* (2013.01); *H04S 2400/15* (2013.01)

(58) Field of Classification Search
CPC .......... H04S 7/301; H04S 7/305; H04S 1/007; H04S 7/303; H04S 7/302; H04S 2400/11
See application file for complete search history.

(56) References Cited

U.S. PATENT DOCUMENTS 9,351,072 B2 5/2016 Siegel et al.
9,351,073 B1 5/2016 Alexandrov
10,540,984 B1 * 1/2020 Malik ................. G10L 21/0232
2005/0216258 A1 * 9/2005 Kobayashi .............. H04M 3/56 704/E21.009
2012/0249785 A1 * 10/2012 Sudo ..................... H04M 9/082 381/80

(Continued)

OTHER PUBLICATIONS

Benesty et al., "A Better Understanding and an Improved Solution to the Specific Problems of Stereophonic Acoustic Echo Cancellation.", Institute of Electrical and Electronics Engineers Transactions on Speech and Audio Processing, vol. 6, No. 2, Mar. 1998, 10 pages.

(Continued)

*Primary Examiner* — Fan S Tsang
*Assistant Examiner* — Tyler Michael Liebgott
(74) *Attorney, Agent, or Firm* — DORITY & MANNING P.A.

(57) ABSTRACT

A stereo audio output signal is obtained based on position information indicative of a position of a participant of a teleconference relative to a plurality of audio output devices, wherein both the participant and the plurality of audio devices are located within a teleconferencing space. Playback of the stereo audio output signal is caused at the plurality of audio output devices located within the teleconferencing space. An audio input signal captured at an audio capture device located within the teleconferencing space is received, wherein at least a portion of the audio input signal comprises audio caused by playback of the stereo audio output signal by the plurality of audio output devices. The position information is used to perform an Acoustic Echo Cancellation (AEC) process to the at least the portion of the audio input signal.

17 Claims, 9 Drawing Sheets

(56) References Cited

U.S. PATENT DOCUMENTS

| | | | | |
|---|---|---|---|---|
| 2014/0328490 | A1 | 11/2014 | Mohammad et al. | |
| 2020/0275204 | A1* | 8/2020 | LaBosco | G10L 21/0232 |
| 2022/0116733 | A1* | 4/2022 | Kuthuru | H04N 7/15 |
| 2023/0060081 | A1* | 2/2023 | Tateishi | H04R 3/02 |
| 2023/0084225 | A1* | 3/2023 | Laitinen | H04M 3/568 381/303 |

OTHER PUBLICATIONS

International Search Report and Written Opinion for Application No. PCT/US2023/036129, mailed Feb. 7, 2024, 19 pages.

Yensen et al., "An Acoustic Echo Cancellation Structure For Synthetic Surround Sound", IEEE International Conference on Acoustics, Speech, and Signal Processing, 2001, pp. 3237-3240.

International Preliminary Report on Patentability for Application No. PCT/US2023/036129, mailed Oct. 16, 2025, 12 pages.

* cited by examiner

MINIMIZING ECHO CAUSED BY STEREO AUDIO VIA POSITION-SENSITIVE ACOUSTIC ECHO CANCELLATION

FIELD

The present disclosure relates generally to Acoustic Echo Cancellation (AEC). More specifically, the present disclosure relates to enhancing AEC processes via the use of positioning information for audio output devices within a teleconferencing space.

BACKGROUND

Conventional teleconferencing services provide stereo audio (e.g., audio via two audio channels) to enhance the experience of participants. To do so, a teleconferencing computing system broadcasts an audio signal (e.g., a mono audio input signal) to a participant computing device, which then renders a stereo audio output signal and causes playback of the stereo audio output signal via audio output devices (e.g., speakers, etc.). To further enhance the participant experience, some participant computing devices optimize the rendering of stereo audio output signals by accounting for the position of the participant.

SUMMARY

Aspects and advantages of implementations of the present disclosure will be set forth in part in the following description, or can be learned from the description, or can be learned through practice of the implementations.

One example aspect of the present disclosure is directed to a computer-implemented method. The method includes generating, by a teleconference computing system comprising one or more computing devices, a stereo audio output signal based on position information indicative of a position of a participant of a teleconference relative to a plurality of audio output devices, wherein both the participant and the plurality of audio output devices are located within a teleconferencing space. The method includes causing, by the teleconference computing system, playback of the stereo audio output signal at the plurality of audio output devices located within the teleconferencing space. The method includes receiving, by the teleconference computing system, an audio input signal captured at an audio capture device located within the teleconferencing space, wherein at least a portion of the audio input signal comprises audio caused by playback of the stereo audio output signal by the plurality of audio output devices. The method includes using, by the teleconference computing system, the position information to perform an Acoustic Echo Cancellation (AEC) process to the at least the portion of the audio input signal.

Another example aspect of the present disclosure is directed to a teleconference computing system. The teleconference computing system can include one or more processors and one or more non-transitory computer-readable media that store instructions that, when executed by the one or more processors, cause the computing system to perform operations. The operations can include obtaining position information, wherein the position information is indicative of a position of a first participant associated within a teleconferencing space, and a position of a second participant within a second teleconferencing space, wherein the first participant is associated with the teleconference computing system and the second participant is associated with a second teleconference computing system. The operations can include rendering, from a mono audio output signal from the second teleconference computing system, a stereo audio output signal based on the position information. The operations can include causing playback of the stereo audio output signal at a plurality of audio output devices located within the teleconferencing space. The operations can include receiving an audio input signal captured at an audio capture device located within the teleconferencing space, wherein at least a portion of the audio input signal comprises audio caused by playback of the stereo audio output signal by the plurality of audio output devices. The operations can include processing the audio output signal with a linear portion of an AEC module. The operations can include processing the audio input signal with a non-linear portion of the AEC module based on the position information and an estimated performance of the linear portion of the AEC module.

Another example aspect of the present disclosure is directed to one or more non-transitory computer-readable media that store instructions that, when executed by one or more processors, cause the one or more processors to perform operations. The operations include generating a stereo audio output signal based on position information indicative of a position of a participant of a teleconference relative to a plurality of audio output devices, wherein both the participant and the plurality of audio output devices are located within a teleconferencing space. The operations include causing playback of the stereo audio output signal at the plurality of audio output devices located within the teleconferencing space. The operations include receiving an audio input signal captured at an audio capture device located within the teleconferencing space, wherein at least a portion of the audio input signal comprises audio caused by playback of the stereo audio output signal by the plurality of audio output devices. The operations include using the position information to perform an AEC process to the at least the portion of the audio input signal.

Other aspects of the present disclosure are directed to various systems, apparatuses, non-transitory computer-readable media, user interfaces, and electronic devices.

These and other features, aspects, and advantages of various implementations of the present disclosure will become better understood with reference to the following description and appended claims. The accompanying drawings, which are incorporated in and constitute a part of this specification, illustrate example implementations of the present disclosure and, together with the description, serve to explain the related principles.

BRIEF DESCRIPTION OF THE DRAWINGS

Detailed discussion of implementations directed to one of ordinary skill in the art is set forth in the specification, which makes reference to the appended figures, in which.

Figure 1:
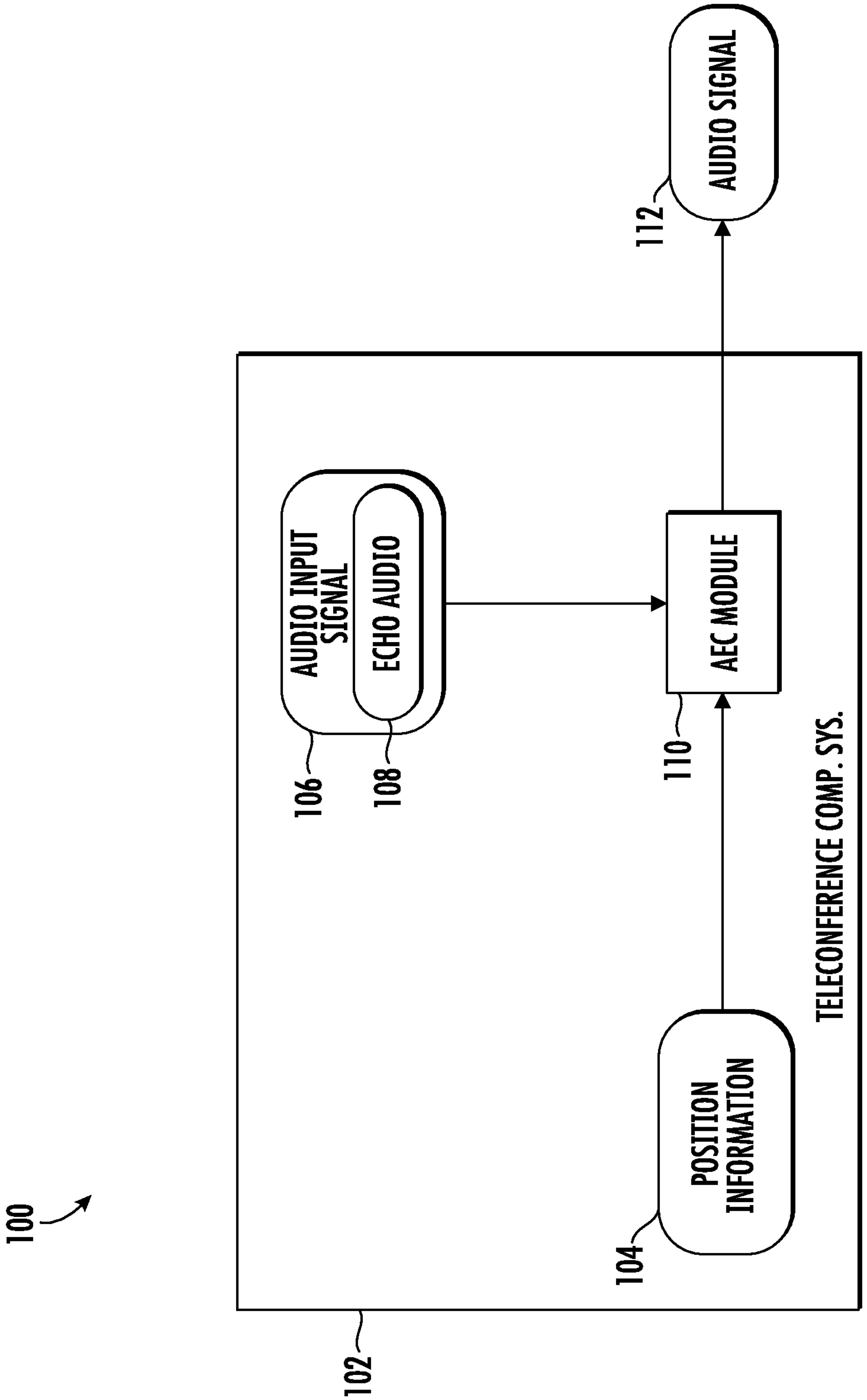
FIG. 1 is an overview data flow diagram for minimizing echo caused by stereo audio via position-sensitive Acoustic Echo Cancellation (AEC) according to some implementations of the present disclosure.

Reference numerals that are repeated across plural figures are intended to identify the same features in various implementations.

DETAILED DESCRIPTION

Generally, the present disclosure is directed to enhancing Acoustic Echo Cancellation (AEC) processes based on the position (e.g., physical, virtual, etc.) of a participant within a teleconferencing space (e.g., a booth, room, enclosure, etc.). More specifically, many teleconferencing services (e.g., audioconference services, videoconference services, etc.) have increasingly focused on making teleconferencing sessions feel more immersive to participants. One way to increase immersion is to provide stereo audio (rather than mono audio) to increase the perceived realism of audio communications. More advanced teleconferencing techniques can enhance the stereo audio by rendering the signals based on the position of an intended participant (e.g., a human user who is intended to hear the audio) within a teleconferencing space (e.g., a booth, etc.).

Another way that teleconferences are made to feel more immersive to participants is the usage of AEC processes. AEC processes are used to suppress (i.e., reduce), or eliminate, any echo caused by audio from audio output devices being captured by nearby audio input devices (e.g., a microphone, etc.). However, AEC processes are generally less effective when applied to stereo audio. One reason is the well-known "non-uniqueness" problem, which arises when stereo audio signals sent to multiple audio output devices are correlated. Playback of the correlated signals by the audio output devices causes multiple possible solutions to equations used by AEC processes, leading to reduced AEC effectiveness. Echo audio that is not suppressed due to this reduced AEC effectiveness can cause a decrease in the immersion of participants.

Accordingly, to effectively remove echoes from audio communications while retaining the benefits of stereo audio signals, implementations of the present disclosure propose minimizing the echo caused by stereo audio by enhancing AEC processes with position data that indicates a position of the participant. For example, a computing system, such as a teleconference computing system, can determine position information for generating enhanced stereo audio. The position information can indicate the position of a participant within a teleconferencing space. The audio output devices can begin playback of a stereo audio output signal rendered using the position information. During (or after) playback of the stereo audio output signal, the teleconference computing system can receive an audio input signal captured using an audio capture device that is also located within the teleconferencing space.

Aspects of the present disclosure provide a number of technical effects and benefits. As one example, conventional AEC processes can expend substantial quantities of computing resources when attempting to reduce echo caused by stereo audio output signals (e.g., power, memory, compute cycles, storage, bandwidth, etc.). Furthermore, conventional AEC processes often fail to effectively reduce this type of echo, and in attempting to do so, can also significantly reduce the quality of the stereo audio output signal (e.g., introducing latency and/or noise to the signal, reducing the clarity of the audio signal, etc.). However, implementations of the present disclosure facilitate suppression, or elimination, of echo from stereo audio output signals using information that is already used to render the signals, therefore obviating the expenditure of any additional computing resources. Furthermore, when used to reduce or eliminate echo from audio signals, implementations of the present disclosure only minimally reduce (if at all) the quality of the audio signal in comparison to conventional techniques.

With reference now to the Figures, example implementations of the present disclosure will be discussed in further detail.

FIG. 1 is an overview data flow diagram 100 for minimizing echo caused by stereo audio via position-sensitive acoustic echo cancellation according to some implementations of the present disclosure. In particular, a teleconference computing system 102 (e.g., a participant computing device such as a smartphone or laptop, etc.) can obtain position information 104. The position information 104 can indicate a position of a participant of a teleconference relative to stereo audio output devices and within a teleconferencing space (e.g., an enclosed space in which the participant is teleconferencing, etc.).

Position information, such as position information 104 can be generated to enhance the quality of stereo audio so that teleconferencing feels more immersive for participants. This is often accomplished within an enclosed, purpose-built teleconferencing space, such as a teleconferencing booth (e.g., an enclosed or semi-enclosed booth equipped with exceedingly high-quality teleconferencing peripherals, etc.). For example, in some implementations, the teleconferencing booth can include sensors (e.g., video capture devices, pressure sensors, ultrawideband (UWB) sensors, etc.) that capture sensor data to determine the position of the participant within the booth. The position information 104 can be determined based on this sensor data, and can be used to enhance the quality of stereo audio within the booth.

However, as described previously, echo caused by playback of stereo audio is inherently more difficult to suppress with AEC processes. Furthermore, the playback of audio within enclosed/semi-enclosed spaces, such as teleconferencing booths, serves as another source of echo that is particularly difficult to suppress. As such, if an audio input signal includes echo caused by these difficulties, processing of the audio input signal using a conventional AEC process is unlikely to fully suppress the echo audio.

As such, implementations of the present disclosure propose the enhancement of AEC processes with position information that indicates a position of a participant within a teleconferencing space. For example, audio input signal 106 can include echo audio 108 caused by playback of stereo audio within a semi-enclosed teleconferencing booth. The position information 104, which was obtained previously to enhance stereo audio (and therefore incurs no additional processing cost), can be provided to the AEC module 110. The AEC module 110 can leverage the position of the participant within the teleconferencing space to more effectively suppress the echo audio 108 included in the audio input signal 106. In such fashion, by processing the audio input signal 106 with the AEC module 110 based on the position information 104, the teleconference computing system 102 can efficiently and effectively provide an audio signal 112 in which the echo audio 108 has been removed or otherwise suppressed to imperceptible or near-imperceptible levels.

Figure 2:
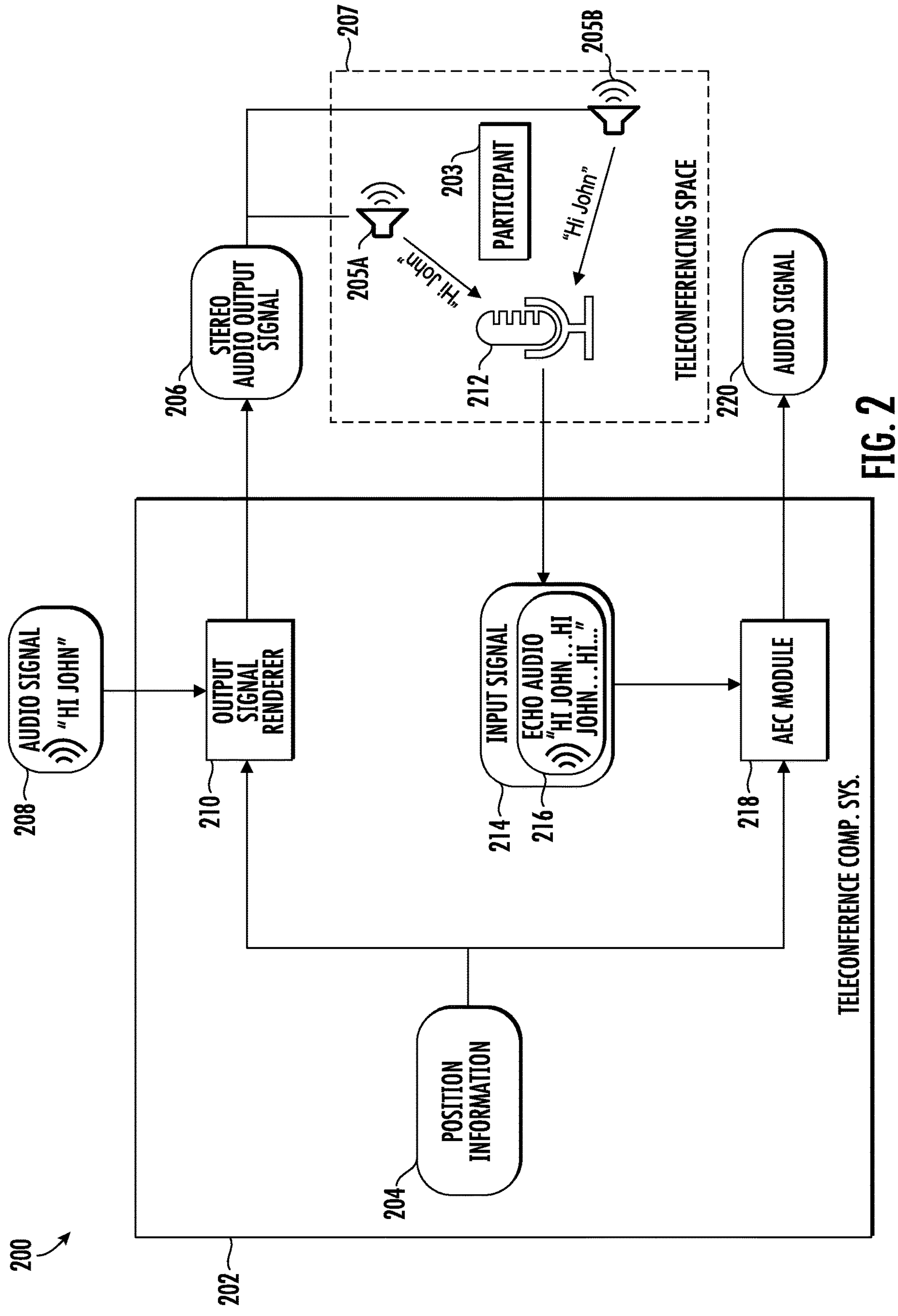
FIG. 2 is a more detailed data flow diagram for minimizing echo caused by stereo audio via position-sensitive acoustic echo cancellation according to some implementations of the present disclosure.

FIG. 2 is a more detailed data flow diagram 200 for minimizing echo caused by stereo audio via position-sensitive acoustic echo cancellation according to some implementations of the present disclosure. In particular, a teleconference computing system 202 can obtain position information 204 (e.g., via sensor data captured from sensors within a teleconferencing space as described with regards to position information 104 of FIG. 1). The position information 204 can indicate a position of a participant 203 of a teleconference relative to multiple audio output devices 205A and 205B (generally, audio output devices 205) within a teleconferencing space 207 (e.g., a videoconference, an audioconference, a multimedia conference, etc.).

For example, a participant 203 of a teleconference can be seated within a teleconferencing space 207, such as a teleconferencing booth that includes two built-in audio output devices 205 (e.g., speakers, open-eared headphones, a stereo-capable soundbar including multiple devices, etc.), and the position information 204 (position parameters, a position vector, etc.) can indicate the position of the participant 203, or a portion of the participant 203 (e.g., the head of the participant 203) relative to audio output device 205A and audio output device 205B within the teleconferencing space 207 (e.g., a vector that indicates x/y/z coordinates for the head of the participant 203, a distance vector that measures a distance between the participant 203 and the audio output devices 205, etc.).

In some implementations, the participant 203 can be a "near-side" participant associated with the teleconference computing system 202 (e.g., the intended recipient of the audio signal 208). Additionally, or alternatively, in some implementations, the participant 203 can be a "far-side" participant associated with a separate teleconference computing system (e.g., the teleconference computing system that provides the audio signal 208 to the teleconference computing system 202. "Near-side" and "far-side" participants, and the indication of their positions with position information 204, will be discussed in greater detail with regards to FIG. 7.

The teleconference computing system 202 can provide a stereo audio output signal 206. Stereo audio, as carried by stereo audio output signal 206, can refer to a type of sound reproduction that recreates a multi-directional audible perspective for a participant. This multi-directional perspective can be used to facilitate directional audio, and/or provide more realistic audio playback for participants. In some implementations, the teleconference computing system 202 may receive an audio signal 208 (e.g., a stereo audio signal, a mono audio signal, etc.) from another computing system (e.g., indirectly via a host system or directly via peer-to-peer communications). Using the output signal renderer 210, the teleconference computing system 202 can leverage the position information 204 to enhance the audio signal 208 to generate the stereo audio output signal 206.

For example, in some implementations, the teleconference computing system 202 can receive an audio signal 208 that carries mono audio (e.g., a unidirectional type of sound reproduction) via a peer-to-peer transmission, and can provide the audio signal 208 and the position information 204 to an output signal renderer 210. The output signal renderer 210 can render the stereo audio output signal 206 from the audio signal 208 carrying the mono audio based on the position information 204 (e.g., rendering the stereo audio output signal 206 to account for the positioning of the audio output devices 205 relative to the participant 203, etc.). The teleconference computing system 202 can cause playback of the stereo audio output signal 206 at the audio output devices 205.

As described with regards to FIG. 1, an audio capture device 212 can also be located within the teleconferencing space 207. The audio capture device 212 can be used to capture an audio input signal 214 that includes audio from the participant 203 (e.g., spoken utterances, etc.). The audio input signal 214 can then be transmitted to other participants of the teleconference (e.g., directly or indirectly). However, due to the co-location of the audio capture device 212 and the audio output devices 205 within the teleconferencing space 207, playback of the stereo audio output signal 206 at the audio output devices 205 can inadvertently be captured by the audio capture device 212, which in turn can cause echo audio.

As such, at least a portion of the audio input signal 214 received from the audio capture device 212 by the teleconference computing system 202 can include echo audio 216. The echo audio 216 can be audio caused by playback of the stereo audio output signal 206 by the audio output devices 205. To follow the example depicted in FIG. 2, the stereo audio output signal 206 can include audio of a spoken utterance of the phrase "Hi John" by another participant of the teleconference. When "Hi John" is played by the audio output devices 205, the audio capture device 212 can capture that audio in the audio input signal 214 as echo audio 216.

If the echo audio 216 is not removed from the input signal 214 before the input signal 214 is provided to the teleconference computing systems of other participants of the teleconference, the echo audio 116 is likely to reduce the other participants immersion in the teleconference. To follow the previous example, the teleconference participant that uttered "Hi John" will hear themselves saying "Hi John" due to the inclusion of the echo audio 216 in the input signal 214, therefore substantially reducing that participant's immersion in the teleconference.

Accordingly, before providing the audio input signal 214 to other teleconference computing systems, the teleconference computing system 202 can use the AEC module 218 to perform an AEC process to remove the echo audio 216 from the audio input signal 214 based on the position information 204. Specifically, in some implementations, the AEC module 218 can include a linear and non-linear portion. The linear portion of the AEC module 218 can suppress linear echo audio (e.g., echo that is "easier" to remove) while the non-linear portion can suppress non-linear echo based on the position information 204. By processing the input signal 214 with the AEC module 218, the teleconference computing system 202 can generate an audio signal 220 in which echo audio 216 has been eliminated or reduced. Suppression of non-linear echo audio will be discussed in greater detail with regards to FIGS. 4 and 5.

Figure 3:
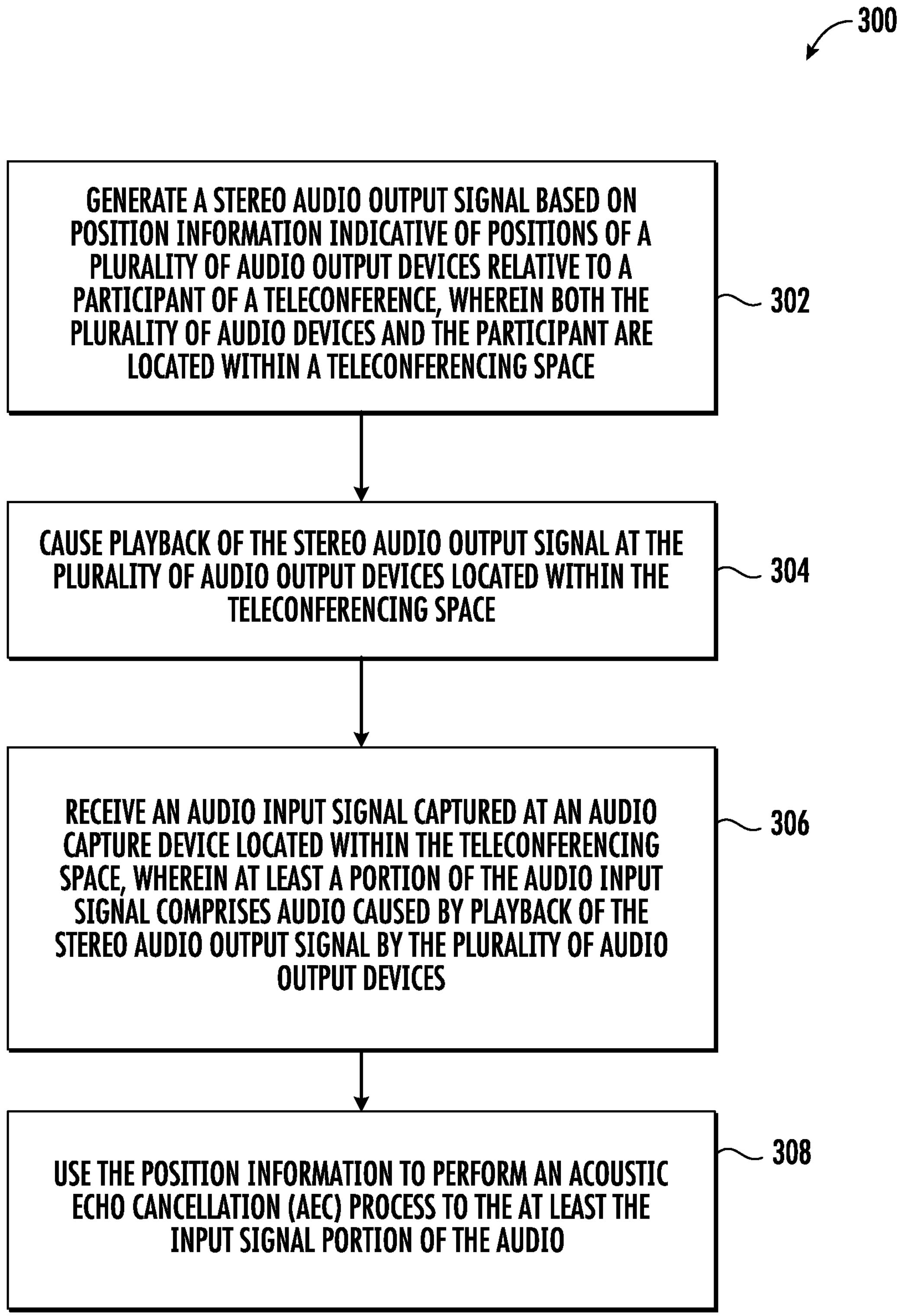
FIG. 3 is a flow diagram of an example method for minimizing echo caused by stereo audio via position-sensitive acoustic echo cancellation, in accordance with some embodiments of the present disclosure.

FIG. 3 is a flow diagram of an example method 300 for minimizing echo caused by stereo audio via position-sensitive acoustic echo cancellation, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the AEC module 110 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 302, processing logic of a computing system (e.g., a teleconference computing system, a participant computing device associated with a participant, etc.) can obtain a stereo audio output signal. In some implementations, the stereo audio output signal can be received from a participant computing device, or from another teleconference computing system. For example, the teleconference computing system can be a computing system that facilitates participation in a teleconference from teleconferencing space, such as a teleconferencing booth. The teleconference computing system can receive the stereo audio output signal from another teleconference computing system for playback within the teleconferencing space using audio output devices located in the teleconference computing space.

Alternatively, in some implementations, the stereo audio output signal can be generated based on position information. The position information can indicate a position of a participant of a teleconference relative to audio output devices within a teleconferencing space. Specifically, both the audio output devices and the participant can be located within the teleconferencing space. For example, the teleconferencing space can be a physical teleconferencing booth, and the position information can indicate a physical position of a head region of the participant relative to the audio output devices.

Additionally, or alternatively, in some implementations, the position information can be, or otherwise include, virtual position information that indicates a virtual position of the participant within the teleconference. More specifically, in some implementations, the teleconference can include a virtual teleconferencing environment (e.g., a two-dimensional virtual environment, a three-dimensional virtual environment, etc.). Often, teleconference services will provide such virtual environments to facilitate directional audio and interactivity, therefore increasing the immersion of participants in the teleconference. The participants can be positioned at discrete virtual positions within the virtual teleconferencing environment. For example, the interface of the teleconference displayed to participants can be a two-dimensional plane in which representations of participants (e.g., avatars, video streams, thumbnails, etc.) are positioned. The position information can indicate a position of the participant relative to the other participants of the teleconference within the virtual teleconferencing environment.

For a more specific example, within the previously described two-dimensional interface, a representation of a speaking participant in the teleconference that is actively speaking (e.g., actively providing an audio input signal that carries a spoken utterance from the participant) can be positioned west (i.e., to the left) of a representation of a listening participant. Based on the virtual position information, the processing logic can generate a stereo audio output signal that accounts for the positioning of the listening participant relative to the speaking participant within the interface. More specifically, if the audio output devices are two devices positioned to the right and the left of the participant within the teleconferencing space, respectively, playback of the stereo audio output signal can be louder at the audio output device to the left of the listening participant to simulate more realistic directional audio. Position information will be discussed in greater detail with regards to FIGS. 6 and 7.

In some implementations, prior to generating the stereo audio output signal, the processing logic can obtain the position information indicative of the position of the participant of the teleconference relative to the audio output devices within the teleconferencing space. More specifically, in some implementations, the processing logic can obtain the position information using position sensor(s) located within the teleconferencing space. The position sensor(s) can provide position sensor data that indicates a position of at least the participant within the teleconferencing space (and, in some implementations, the positions of the audio output devices).

In some implementations, the processing logic can obtain the position information by analyzing position sensor data from position sensors located within the teleconferencing space. For example, in some implementations, the position sensors can include a video capture device that captures video data. The processing logic can receive the video data (e.g., position sensor data) from the video capture device (e.g., position sensor(s)) located within the teleconferencing space. The video data can depict the participant within the teleconferencing space. The processing logic can analyze the video data to obtain the position information. For example, the processing logic can perform a computer vision task that determines an approximate position of the participant within a three-dimensional space.

As a more specific example, the processing logic may include a machine-learned computer vision model that is trained to determine a relative location of the participant within the teleconferencing space. For example, the processing logic may obtain a trained machine-learned computer vision model from another entity, such as a teleconference orchestration entity. The machine-learned computer vision model can be any type or manner of model that is trained to determine a relative location of a participant within the teleconferencing space (e.g., a neural network, deep learning network, recurrent neural network, etc.).

In some implementations, the teleconferencing space can be a purpose-built teleconferencing space, such as a teleconferencing booth, and the position sensor(s) can be or otherwise include sensors built into the teleconferencing space. For example, the position sensor(s) can be infrared sensors that emit an infrared beam within the teleconferencing space, and can provide position sensor data to the processing logic when the infrared beam is disrupted by the participant. For another example, the position sensor(s) can be pressure sensors installed in a seat (e.g., a bench, etc.) located within the teleconferencing space, and can provide position sensor data to the processing logic when the pressure caused by the participant changes. More generally, it should be broadly understood that the position sensor(s) can be any type or manner of sensor(s) that is/are operable to determine a position of the participant 203 within the teleconferencing space (e.g., RADAR sensors (e.g., Doppler units), ultrasonic sensors, motion sensors, temperature sensors, wireless signaling from wearable devices of the participant (e.g., Bluetooth, etc.) vibration sensors, etc.).

In some implementations, if the audio capture device is a directional microphone, the processing logic can utilize the directionality of the audio input signal to further refine the determination of the approximate location of the participant within the teleconferencing space.

In some implementations, the processing logic can render the stereo audio output signal from a mono audio output signal. For example, the processing logic can receive a mono audio output signal from a teleconference orchestration entity (e.g., a virtualized cloud computing device that hosts teleconferencing sessions, etc.), or from another teleconference computing system (e.g., a participant computing device, etc.). The processing logic can synthetically render the stereo audio output signal from the mono audio output signal based on the position information.

In some implementations, the processing logic can generate the stereo audio output signal based on the position information and a teleconferencing role currently assigned to the participant and/or other participants of the teleconference. For example, the processing logic can render the stereo audio output signal from a mono audio output signal. The mono audio output signal can include audio from a participant with an active speaker role (e.g., a teleconferencing role indicating that the participant is currently speaking) and audio from a participant in a non-speaker role (e.g., a teleconferencing role indicating that the participant is not currently speaking). The processing logic can generate the stereo audio output signal such that, when played, the audio from the active speaker participant is louder than the audio from the non-speaker participant.

In some implementations, the processing logic can also obtain position information for another participant. Specifically, the processing logic can obtain position information for a participant associated with the stereo audio output signal. For example, a computing system that is providing an audio output signal can be referred to as a "far-end" computing system, and a computing system that is receiving an audio output signal (e.g., the computing system that includes the processing logic of operation 302) can be referred to as a "near-end" computing system. The far-end computing system can be a separate teleconference computing system associated with a different participant in another teleconferencing space. The far-end computing system can capture an audio input signal (e.g., a spoken utterance, etc.) and can provide the audio input signal to the near-end processing logic as an audio output signal. However, the far-end computing system can also determine far-end position information for the other associated participant that indicates the position of the different participant within the other teleconferencing space. The separate teleconference computing system can provide this far-end position information to the near-end computing system, and the near-end computing system can obtain near-end position information for the participant in the teleconferencing space. In some implementations of the present disclosure, the utilization of both near-end position information and far-end position information can further enhance the effectiveness of AEC processes.

At operation 304, the processing logic can cause playback of the stereo audio output signal at the audio output devices located within the teleconferencing space. In some implementations, if the audio output devices are analog devices (e.g., passive speakers, etc.), the processing logic can cause playback of the stereo audio output signal by passing the stereo audio output signal to the audio output devices via a physical medium, such as a cable (e.g., a speaker cable). Alternatively, in some implementations, if the audio output devices are digital device(s), or are communicatively coupled to a digital device (e.g., a receiver, the computing device, a separate computing device, etc.), the processing logic can provide the stereo audio input signal to the digital device(s) in a wired or wireless manner (e.g., wireless signaling across a network (e.g., a Publicly Switched Telephone Network (PSTN), Bluetooth, Wifi, etc.), via an HDMI interface, Displayport interface, digital audio cable, coaxial cable, etc.).

At operation 306, the processing logic can receive an audio input signal captured at an audio capture device located within the teleconferencing space. At least a portion of the audio input signal can include audio caused by playback of the stereo audio output signal by the audio output devices.

At operation 308, the processing logic can use the position information to perform an AEC process to the at least the portion of the audio input signal. For example, a relatively small portion of the audio input signal can include the audio caused by the playback of the stereo audio output signal. The processing logic can perform the AEC process to that relatively small portion. Alternatively, the processing logic can perform the AEC process to a larger portion of the stereo audio output signal that includes the small portion, or can perform the AEC process to the entire stereo audio output signal.

In some implementations, using the position information to perform the AEC process can include processing the audio input signal with a linear portion and a non-linear portion of an AEC module of the processing logic. More specifically, in some circumstances, echo can include linear echo and non-linear echo. Linear echo is directly caused by audible production of a received audio signal. In other words, this echo is the audio included in the audio signal as played back by the speakers. More generally, the echo has a "linear" relationship between the input (audio input signal) and output (audio produced by playback of the audio signal). Conversely, non-linear echo is echo caused by non-linearities and other disturbances. This could be loudspeaker characteristics, cabinet vibrations, complicated waveform deformations, etc. More generally, the echo has a "non-linear" relationship between the input (audio input signal) and output (non-linearities introduced when playing the input signal).

In some implementations, to process the audio input signal with the non-linear portion of the AEC module, the processing logic can assign the position information to one of multiple position clusters. The position clusters can be clusters of priorly obtained sets of position information, and can be respectively associated with linear portion performance estimates (e.g., ten position clusters can be associated with ten respective linear portion performance estimates, etc.).

The processing logic can process the audio input signal with the non-linear portion of the AEC module based on the linear portion performance estimate that is associated with the position cluster to which the position information is assigned. Generally, a linear portion performance estimate can indicate an estimation of the "quantity", or "degree" of the total echo removed by the linear portion. In other words, the linear portion performance estimate can indicate In some implementations, the processing logic can determine a change in a position of the participant within the teleconferencing space relative to the audio output devices. For example, the processing logic can receive position sensor data that indicates a change in the position of the participant as described previously (e.g., pressure sensor data, video data, infrared data, etc.). The processing logic can obtain updated position information that indicates a new position of the audio output devices relative to the participant. For example, the position information can be a direction vector that indicates one of the audio output devices is positioned 5 feet to the left of the participant. The updated position information can indicate that the same audio output device is positioned 3 feet to the left of the participant. In such fashion, the processing logic can iteratively obtain position information that indicates the position of the audio output devices relative to the participant.

In some implementations, the processing logic can use the updated position information to render an updated stereo audio output signal for playback at the audio output devices. The processing logic can receive an updated audio input signal captured at the audio capture device. The updated audio input signal (or a portion of the signal) can include audio caused by playback of the updated stereo audio output signal. The processing logic can assign the updated position information to a new position cluster that is associated with a linear portion performance estimate different than that of the previous position cluster. The processing logic can process the updated audio input signal with the non-linear portion of the AEC module based on the linear portion performance estimate associated with the new position cluster. In such fashion, the processing logic can iteratively select a linear portion performance estimate to adjust for movements by the participant.

In some implementations, the position cluster to which the position information is assigned can be updated based on the position information. For example, if the difference between the position information and the prior sets of position information in the same position cluster is greater than a threshold degree of difference, the processing logic can generate a new linear portion performance estimate, and can update the linear portion performance estimate associated with the cluster based on the newly generated linear portion performance estimate. For example, if the newly generated linear portion performance estimate was 30% higher than the linear portion performance estimate currently associated with the position cluster, the processing logic can update the linear portion performance estimate currently assigned to the cluster based on the 30% difference (e.g., update by 5%, 10%, 20%, etc.).

In some implementations, the linear portion performance estimate is updated according to a learning rate. To follow the previous example, if the difference between the newly generated linear portion performance estimate is 30%, and the learning rate is X (e.g., a random value, etc.), the processing logic can update the linear portion performance estimate by a certain degree (e.g., 5%). But, if the learning rate is greater than X, the processing logic can update the linear portion performance estimate by a greater degree (e.g., 5%)

In some implementations, the processing logic can update more than one position cluster. For example, the position clusters can exist within an embedding space. The processing logic can update the position cluster to which the position information is assigned at a learning rate of X, and can update the position cluster(s) closest to that cluster at a learning rate less than X. In such fashion, the processing logic can efficiently propagate updates to similar position clusters by selecting neighboring clusters within the embedding space. In some implementations, the linear portion performance estimate can be an Echo Return Loss Enhancement (ERLE) estimation.

Alternatively, in some implementations, to use the position information to perform the AEC process, the processing logic can process the audio input signal and the position information with a machine-learned AEC model trained to perform the AEC process. For example, the processing logic can obtain training information that includes a number of training pairs. The training pairs can be position information and a corresponding ground truth linear portion performance estimate. The processing logic can train the machine-learned AEC model to perform the AEC process using the training pairs.

In some implementations, the processing logic can provide the stereo audio output signal to the teleconference orchestration entity mentioned previously. For example, the teleconference orchestration entity (e.g., a server for a teleconferencing service, a virtualized computing device, etc.) can facilitate the teleconference by acting as an intermediary between teleconference computing systems. More specifically, the processing logic can provide the audio input signal to the teleconference orchestration entity, which can receive an audio input signal, encode the audio input signal, and broadcast the audio input signal to other teleconference computing systems.

Figure 4A:
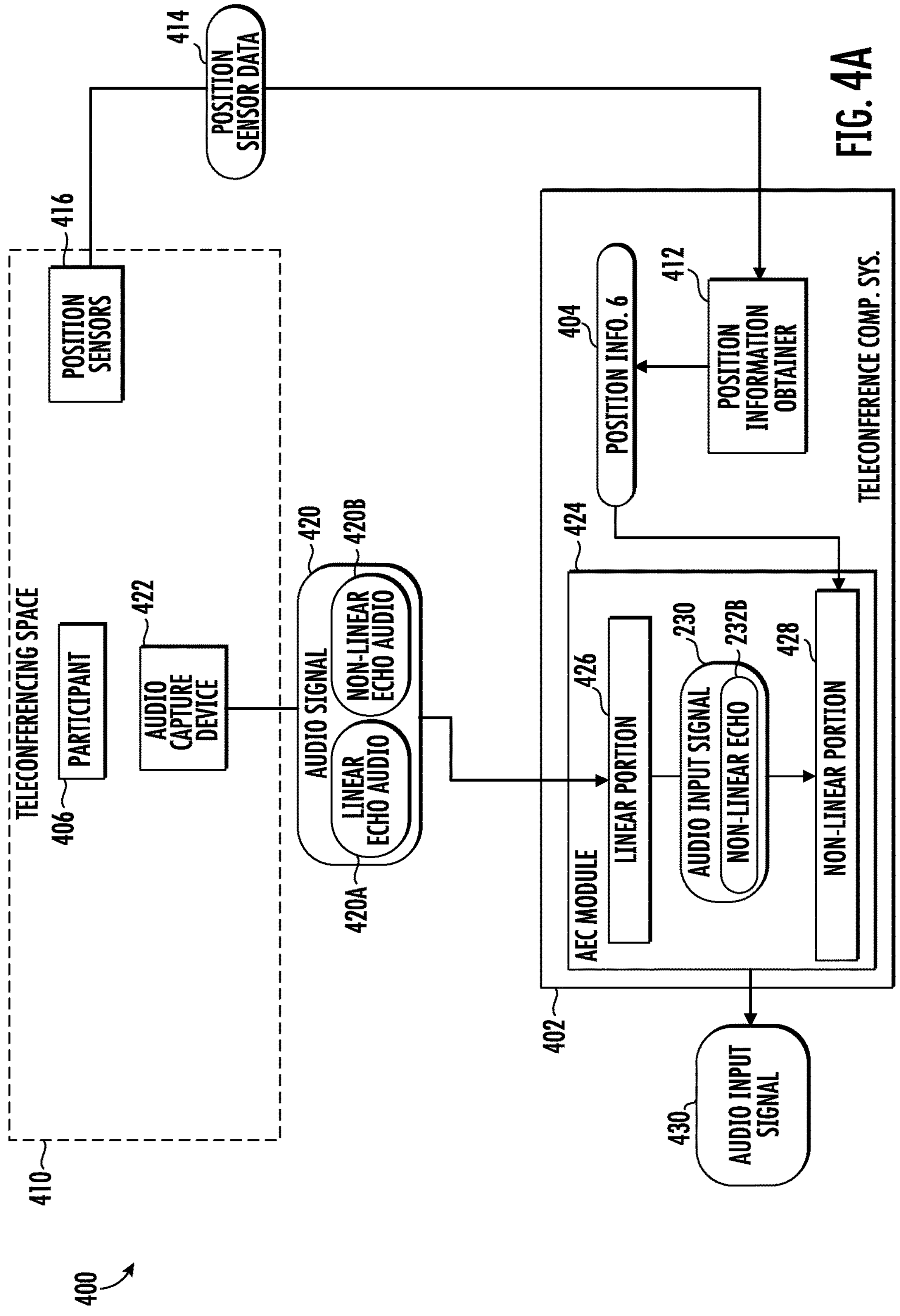
FIG. 4A is a data flow diagram for obtaining position information for performance of linear and non-linear AEC processes according to some implementations of the present disclosure.

FIG. 4A is a data flow diagram 400 for obtaining position information for performance of linear and non-linear AEC processes according to some implementations of the present disclosure. Specifically, the teleconference computing system 402 can obtain position information 404, which can indicate a position of a participant 406 of a teleconference relative to multiple audio output devices 408 within a teleconferencing space 410. For example, the teleconferencing space 410 can be an enclosed booth that is built for teleconferencing and includes built-in teleconferencing peripherals, such as audio output devices 408. For another example, the teleconferencing space 410 can be a room (e.g., a bedroom, office, kitchen, etc.). For yet another example, the teleconferencing space 410 can be a semi-enclosed portion of a larger space (e.g., a cubicle, a desk in an open office environment, a seat in an auditorium, etc.).

Similarly, the audio output devices 408 can be any type or manner of audio output devices operable to playback an audio output signal. In some implementations, the audio output devices 408 can be multiple, separate audio output devices within an audio output device. For example, audio output devices 408 can both be paired audio drivers in an audio output device (e.g., headphones, earbuds, a soundbar capable of stereo audio or stereo audio emulation, etc.). Alternatively, in some implementations, audio devices 408 can be discrete, separate audio output devices (e.g., a pair of speakers, etc.). Furthermore, it should be noted that, although audio output devices are generally depicted throughout the present disclosure as only including two audio output devices, the audio output devices 408 can be or otherwise include any number of audio output devices. For example, the audio output devices 408 can include 8 separate audio output devices operable to provide 8-channel surround audio output (e.g., 7.1 surround sound).

In some implementations, the teleconference computing system 402 can use a position information obtainer 412 to obtain the position information 404 based on position sensor data 414. For example, in some implementations, position sensor(s) 416 can be located within the teleconferencing space 410. The position sensor(s) 416 can provide position sensor data 414 that indicates a position of the participant 406 within the teleconferencing space 410. The teleconference computing system 402 can process the position sensor data 414 with the position information obtainer 412 to determine the position information 204.

Figure 4B:
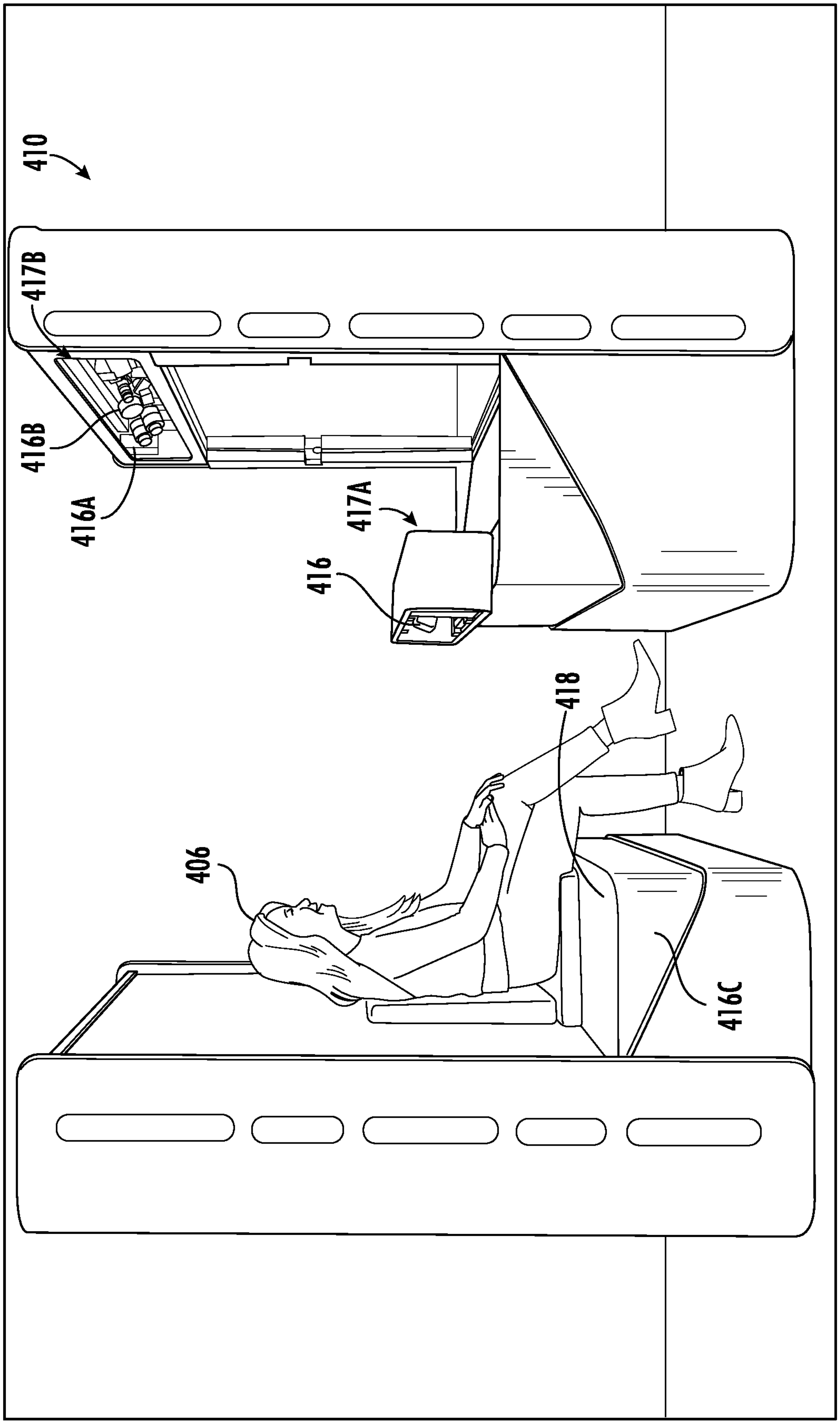
FIG. 4B depicts an example teleconferencing space that includes position sensors to collect position sensor data for a participant located within the teleconferencing space according to some implementations of the present disclosure.

Turning to FIG. 4B for a specific example, FIG. 4B depicts an example teleconferencing space 410 that includes position sensors 416 to collect position sensor data 414 for a participant 406 located within the teleconferencing space 410 according to some implementations of the present disclosure. Specifically, as depicted, the teleconferencing space 410 is a teleconferencing booth that includes position sensors 416 that capture position sensor data 414 for a participant 406. It should be noted that in some implementations, the teleconference computing system 402 can be physically located within the depicted teleconferencing space 410. For example, the teleconference computing system 402 can be located in the bench that the participant is seated upon. For another example, the teleconference computing system 402 can be located opposite the user within the booth that includes the sensors. Alternatively, the teleconference computing system 402 can be located separately from the teleconferencing space 410, and can be communicatively coupled to devices included in the teleconferencing space 410.

For example, in some implementations, the position sensors 416 can include a video capture device 416A that captures video data. Specifically, as depicted, the video capture device(s) 416A can be built into the teleconferencing space 410 in a location above the participant 406, and can capture video data that depicts the participant 406 at an angle. The teleconference computing system 402 can receive the video data captured by video capture device 416A. The video data can depict the participant 406 as they are currently positioned within the teleconferencing space 410. The teleconference computing system 402 can analyze the video data using the position information obtainer 412 to obtain the position information 404. For example, the teleconference computing system 402 can use the position information obtainer 412 to perform a computer vision task that analyzes the video data (e.g., using machine-learned model(s)) to determine a position of the participant 406 within the teleconferencing space 410.

For another example, in some implementations, the position sensors 416 can be or otherwise include infrared sensors 416B that emit an infrared beam (e.g., as conventionally utilized with motion detection technology) within the teleconferencing space 410, and can provide infrared beam data to the teleconferencing computing system 402 when the infrared beam is disrupted by the participant 406. It should be noted that, although the infrared sensors 416B are depicted as being positioned in the same location as the video capture device 416A, both the infrared sensors 416B and the video capture device(s) 416A can be located anywhere within the teleconferencing space 410. For example, one infrared sensor 416B and one video capture device 416A can be located directly in front of the participant 406 in the device cluster 417A, another infrared sensor 416B can be located perpendicular to the participant 406 (e.g., aimed towards the side of the participant 406), and yet another infrared sensor 416B and video capture device 416A can be located above the participant 406 in device cluster 417B, as depicted.

For another example, in some implementations, the position sensors 416 can be, or otherwise include, pressure sensors installed in a seat 418 (e.g., a bench, etc.) located within the teleconferencing space 410, and can provide pressure sensor data 414 to the teleconferencing computing system 402 when the location of pressure exerted by the participant 406 upon the seat 418 changes.

More generally, it should be broadly understood that the position sensor(s) 416 can be any type or manner of sensor that is operable to determine a position of the participant 406 within the teleconferencing space 410. For example, the device cluster 417A, and/or the device cluster 417B, can include ultrawideband (UWB) sensors, LIDAR sensors, etc. Similarly, the teleconferencing space 410 is not limited to a teleconferencing booth, and can be any type or manner of enclosed or semi-enclosed space in which a participant can participant in a teleconference Returning to FIG. 4A, the teleconference computing system 402 can receive an audio signal 420 captured via audio capture device 422. The audio signal 420 can include linear echo audio 420A and non-linear echo audio 420B due to the co-location of the audio capture device 422 and audio output devices within the teleconferencing space 410. The linear echo audio 420A can generally refer to echo audio that is more easily suppressed using AEC processes. More specifically, linear echo audio 420A is echo audio that is not complicated by the previously described problems inherent to stereo audio within a teleconferencing space (e.g., non-linearities, etc.) and is therefore more easily suppressed. Conversely, the non-linear echo audio 420B can refer to echo audio that includes complexities (e.g., complexities associated with the non-uniqueness problem and/or other problems, etc.) and is therefore more difficult to suppress.

The teleconference computing system 402 can use the position information 404 with a AEC module 424 to perform an AEC process to at least the portion of the audio input signal 420 that includes the linear echo audio 420A and the non-linear echo audio 420B (or more of the audio input signal 420). Performing an AEC process can generally refer to the application of some technique that suppresses echo in an audio signal. An AEC process may be, or otherwise include, an algorithm, machine-learned model, etc. In some implementations, the AEC module 234 can include linear portion 236 and non-linear portion 238. Linear echo cancellers, such as the linear portion 426 of the AEC module 424, can perform echo cancellation based on the assumption that echo path is linear. Echo path generally refers to the "path" audio that causes echo takes before it is received by an audio capture device. For example, audio (i.e., sound waves) that travels directly from an audio output device to an audio capture device can have a linear echo path. Audio that bounces off of five different surfaces before capture by an audio capture device can have a non-linear echo path.

However, due to the nature of echo from stereo audio output, such as the echo caused by playback of a stereo audio output signal, and the echo caused by reflection within spaces such as the teleconferencing space 410 (e.g., enclosed spaces, semi-enclosed spaces, etc.), non-linearities can be introduced in the path of the echo to be canceled. As such, the linear portion 426 of the AEC module 424 can be utilized by the teleconferencing computing system 402 to perform linear echo cancellation to remove linear echo audio 420A, and the non-linear portion 428 of the AEC module 424 can be utilized by the teleconferencing computing system 402 to perform non-linear echo cancellation to remove non-linear echo audio 420B based on the position information 404 to obtain audio input signal 430.

For example, the non-linear portion 428 of the AEC module 424 can be utilized to suppress any remaining echo audio that the linear portion 426 did not suppress in the audio input signal 420. In some implementations, the teleconference computing system 402 can increase the accuracy or effectiveness of the non-linear portion 428 by using the position information 404 to predict an estimated performance of the linear portion 426, and then utilize the non-linear portion 428 based on the estimated performance of the linear portion 426.

It should be noted that, generally, the degree to which audio signal quality is degraded by AEC is based on how aggressively an AEC procedure is performed. As such, by processing the audio input signal 420 according to an estimated performance of the linear portion 426, the non-linear portion 428 can perform the AEC process without the risk of audio signal degradation caused by needlessly aggressive performance of the AEC process. In other words, by accounting for the predicted performance of the linear portion 426, the non-linear portion 428 can remove echo audio while minimizing quality degradation in the audio input signal 420. Estimation of linear portion performance for reducing echo audio with a non-linear portion of an AEC module will be discussed in greater detail with regards to FIG. 5.

Figure 5:
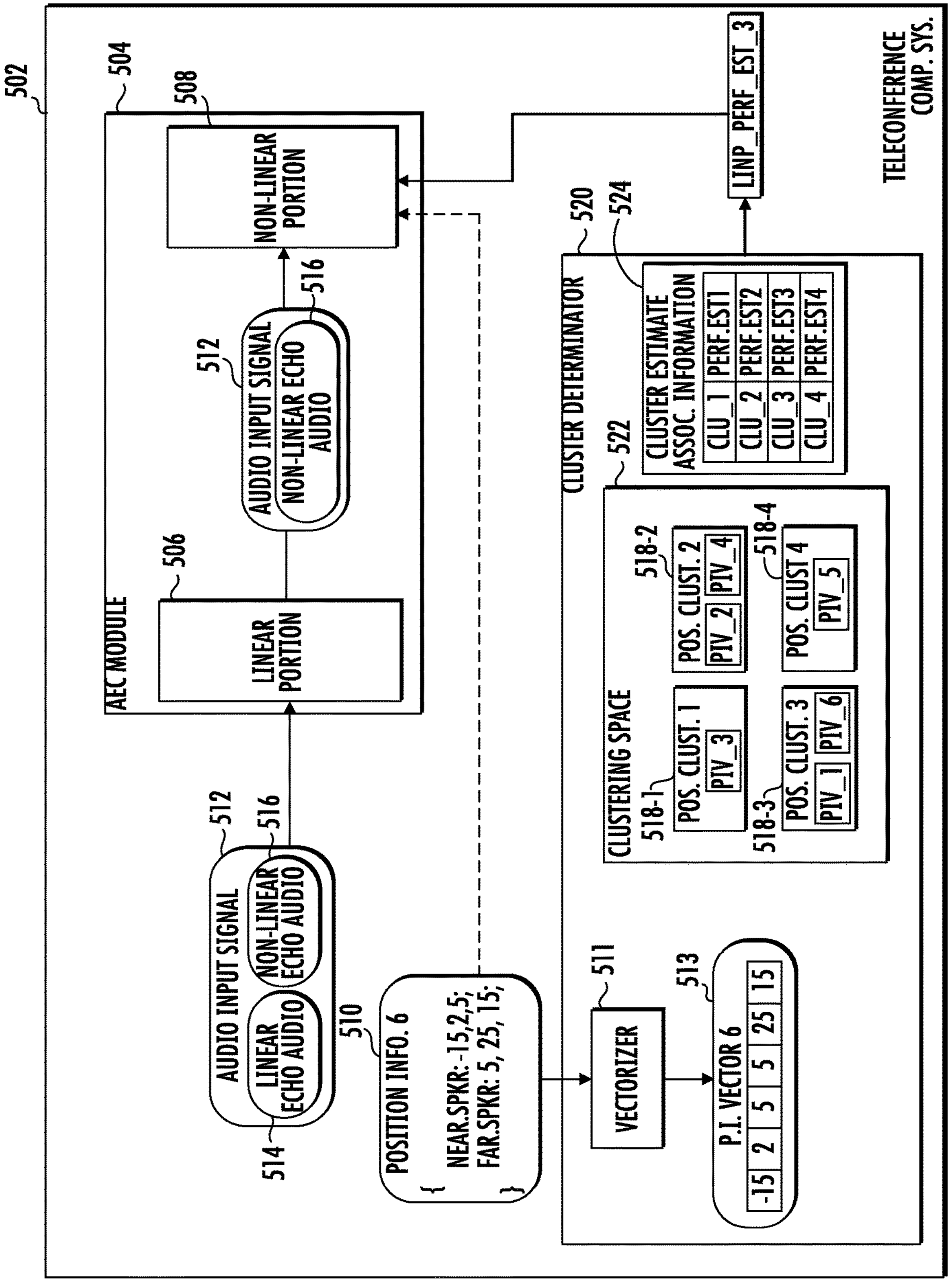
FIG. 5 is a block diagram for reducing echo audio with a non-linear portion of an AEC module using position information clustering according to some implementations of the present disclosure.

FIG. 5 is a block diagram for reducing echo audio with a non-linear portion of an AEC module using position information clustering according to some implementations of the present disclosure. Specifically, teleconference computing system 502 can include an AEC module 504, which can include a linear portion 506 and a non-linear portion 508. The teleconference computing system 502 can obtain position information 510 and an audio input signal 512 that includes linear echo audio 514 and non-linear echo audio 516 as described previously with regards to FIGS. 1, 2, and 4.

The teleconference computing system 502 can process the audio input signal 512 with the linear portion 506 of the AEC module 504 as described previously to remove, or otherwise suppress, the linear echo audio from the audio input signal 512. The teleconference computing system 502 can also assign the position information 510 to a position cluster 518A-518N (generally, position clusters 518). For example, the computing system can use a cluster determinator 520 to assign the position information, or a vector representation of the position information, to a position cluster 518 within a clustering space 522. In the depicted example, the position information 510 is the sixth set of position information received at the clustering determinator, with prior sets of position information 1-5 currently clustered amongst the position clusters 518.

More specifically, in some implementations, the cluster determinator 520 can initialize a certain number of clusters 518. In some implementations, the position information 510 can be vectorized using vectorizer 511. For example, the position information 510 can include x/y/z coordinates for the near-end speaker (e.g., the participant within the teleconferencing space) and the x/y/z coordinates for the far-end speaker (e.g., the participant who's spoken utterance is included in the stereo audio output signal). The two x/y/z coordinate pairs can be grouped in a six-parameter position information vector 513 by the vectorizer 511 for clustering in the clusters 518.

The cluster determinator 520 can initialize centroids to represent each cluster 518. The centroids can, in some implementations, be initialized based on the first position information vectors received for clustering. For example, position cluster 518-1 can be initialized upon initial clustering of PIV_3 (e.g., a prior position information vector, etc.).

For example, assume that, as depicted, the centroids corresponding to the position clusters 518 have been initiated. The cluster determinator 520 can, in some implementations, find a "winner" cluster that represents the position information vector 513. The "winner" cluster can be the cluster with the centroid that has the minimum square distance with the position information vector 513. Once clustered, the cluster determinator 520 can update the centroid positions of the clusters 518. For example, the cluster determinator can update the "winner" cluster (e.g., the position cluster 518 to which the position information vector 513 is assigned) according to:

$$\overline{c} = \overline{c} + \alpha(\overline{c} - \overline{x})$$

where $\overline{c}$ represents the winner centroid, x represents the position information vector 513, and a is the learning rate parameter.

In some implementations, the cluster determinator 520 can update additional centroids in addition to the "winning" centroid. For example, the "non-winner" centroids (e.g., centroids associated with position clusters 518 to which the position information vector is not assigned) can also be updated using a much lower learning rate than a.

In some implementations, the clustering space 522 can be an embedding space, and position information 510, as well as priorly obtained position information, can be embedded in the embedding space. For example, a position information embedding can be generated for the position information 510 and embedded in the clustering space 522. The position clusters 518 can be dynamically determined based on distances between the embeddings for the position information 510 and priorly received position information. Alternatively, in some implementations the position information 510 can take some other form, such as a distance vector, and can be clustered accordingly within the clustering space 522.

As described previously, the position clusters 518 can be associated with performance estimates for the linear portion 506 of the AEC module 504. The cluster determinator can store, or otherwise access, cluster estimate association information 524. The cluster estimate association information 524 can store associations between position clusters and linear portion performance estimates. For example, the cluster estimate association information 524 can store an association between position cluster 1 and linear portion performance estimate 1, position cluster 2 and linear portion performance estimate 2, position cluster 3 and linear portion performance estimate 3, etc.

Based on which position cluster the position information 510 is assigned to, the cluster determinator 520 can use the cluster estimate association information 524 to select a linear portion performance estimate. For example, as position information 510 is assigned to position cluster 518-3, the cluster determinator 520 can use the cluster estimate association information 524 to select linear portion performance estimate 3.

More generally, the cluster determinator 520 can find the relevant clusters that groups similar near-end and far-end positions, and perform a tailored Echo Return Loss Enhancement (ERLE) estimator per cluster. For example, as described previously, the near-end and far-end positions (e.g., the positions of the participants) can be tracked and grouped in clusters so that an ERLE estimation can be performed on a per-cluster basis.

The teleconference computing system 502 can process the audio input signal 512 with the non-linear portion 508 of the AEC module based on the linear performance estimate 3 as described with regards to non-linear portion 428 of FIG. 4. In such fashion, the teleconference computing system can utilize position information clustering to select an optimal linear portion performance estimate for processing of the audio input signal 512 with the non-linear portion 508 of the AEC module 504.

In some implementations, ERLE associated with a position cluster 518 is updated after it is used by the non-linear portion 508. In some implementations, the ERLE associated with a cluster is gradually reduced in importance if no recent position information vectors are assigned to its associated cluster 518. More specifically, if the linear filter has not previously processed points that are close to those position information vectors, such as position information vector 513, the ERLE associated with that cluster can be decreased. Furthermore, in some implementations, if the centroid of the cluster 518 to which the position information vector 513 is assigned is relatively far away from the position information vector 513, a penalization factor can be added to the linear portion performance estimate.

It should be noted that, although the utilization of the position information 510 is discussed primarily with regards to the non-linear portion 508 of the AEC module 504, the position information can also be utilized with the linear portion 506. More specifically, the linear portion 506, or any other portions of the AEC module 504, can operate more efficiently based on the position information 510. For example, the linear portion 506 can process the position information 510 to more effectively eliminate linear echo from the audio input signal 512.

Figure 6:
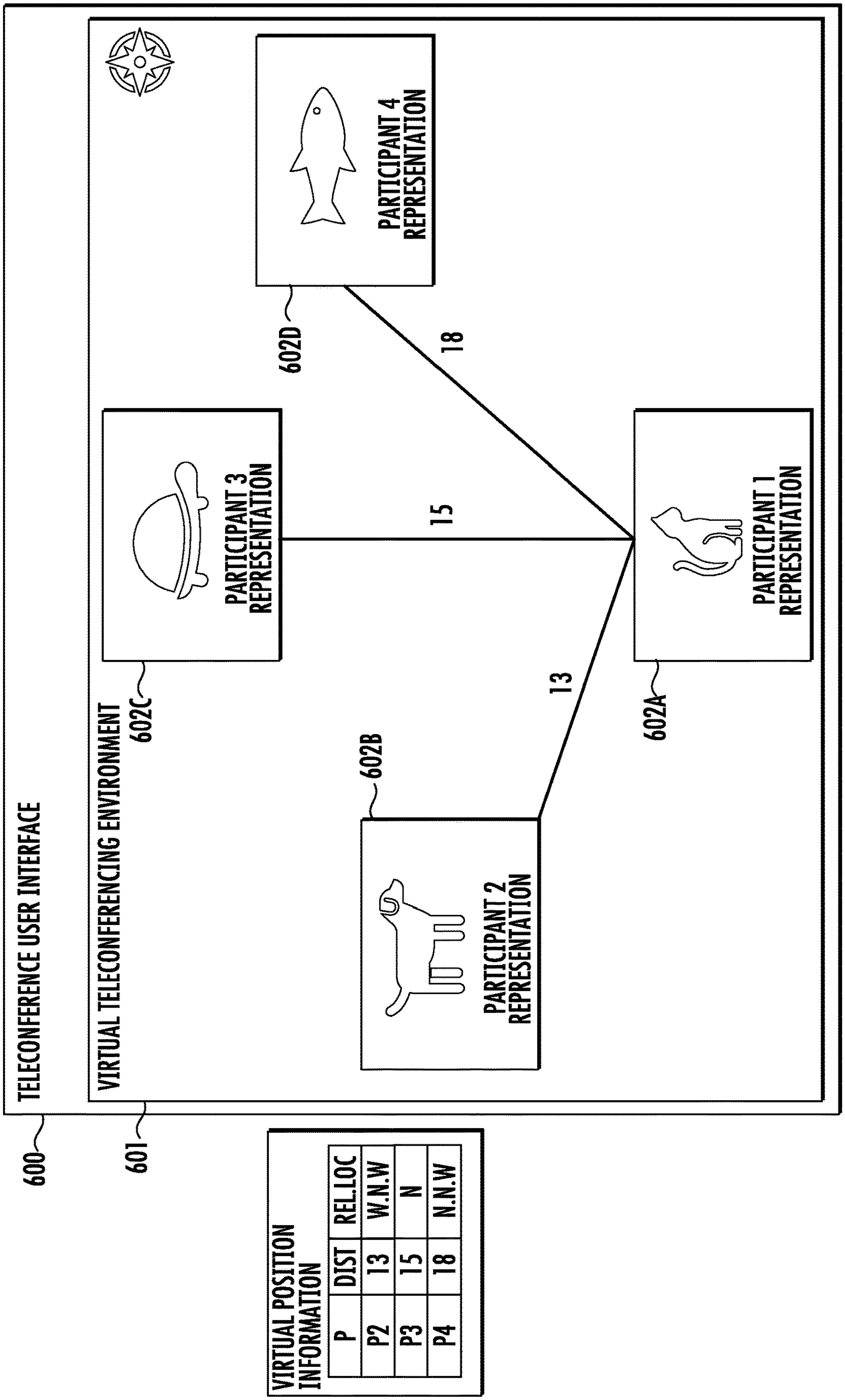
FIG. 6 depicts an example teleconference user interface that depicts a virtualized teleconferencing environment and associated virtual position information according to some implementations of the present disclosure.

FIG. 6 depicts an example teleconference user interface 600 that depicts a virtualized teleconferencing environment 601 and associated virtual position information 603 according to some implementations of the present disclosure. FIG. 6 is depicted to illustrate an example teleconference user interface in which virtual position information may be utilized to generate positional audio for a participant. In particular, teleconference user interface 600 can be displayed to participants of a teleconference via a display device. For example, a participant can participate in a teleconference using a teleconference computing system. The teleconference computing system can display the teleconference user interface 600 using a display device communicatively coupled to the teleconference computing system.

The teleconference user interface 600 depicts a virtualized teleconferencing environment 601. The virtualized teleconferencing environment 601 is a two-dimensional environment in which participant representations 602A-602D (generally, participant representations 602) are located. Although the virtualized teleconferencing environment 601 is depicted as a two-dimensional environment, the virtualized teleconferencing environment 601 can instead be a three-dimensional interface in some other implementations.

The participant representations 602 are positioned in different locations within the virtualized teleconferencing environment 601. Each of the participant representations 602 is located a certain distance from another participant representation 602. For instance, the participant representation 602B is 13 units west-north-west of participant representation 602A. Participant representation 602C is 16 units north of participant representation 602A, and participant representation 602D is 18 units north-north-west of participant representation 602A.

As described with regards to FIG. 3, virtual position information 603 can be generated that indicates a virtual position of a participant representation 602 relative to virtual positions of representations of other participants within the virtual teleconferencing environment 601. Specifically, as depicted, in some implementations the virtual position information 603 can indicate the distances and locations of other participant representations relative to one participant (e.g., the distances and locations of participant representations 602B-602D relative to participant representation 602A). However, the virtual position information 603 is not limited to relative positions and directions. For example, the virtual position information 603 can include two-dimensional coordinates (e.g., x/y coordinates) or three-dimensional coordinates (e.g., x/y/z coordinates) for each participant representation 602 within the two-dimensional or three-dimensional virtual teleconferencing environment 601. More generally, the virtual position information 603 can be any type or manner of information that indicates a position of the participant representation within the virtual teleconferencing environment 601.

Figure 7:
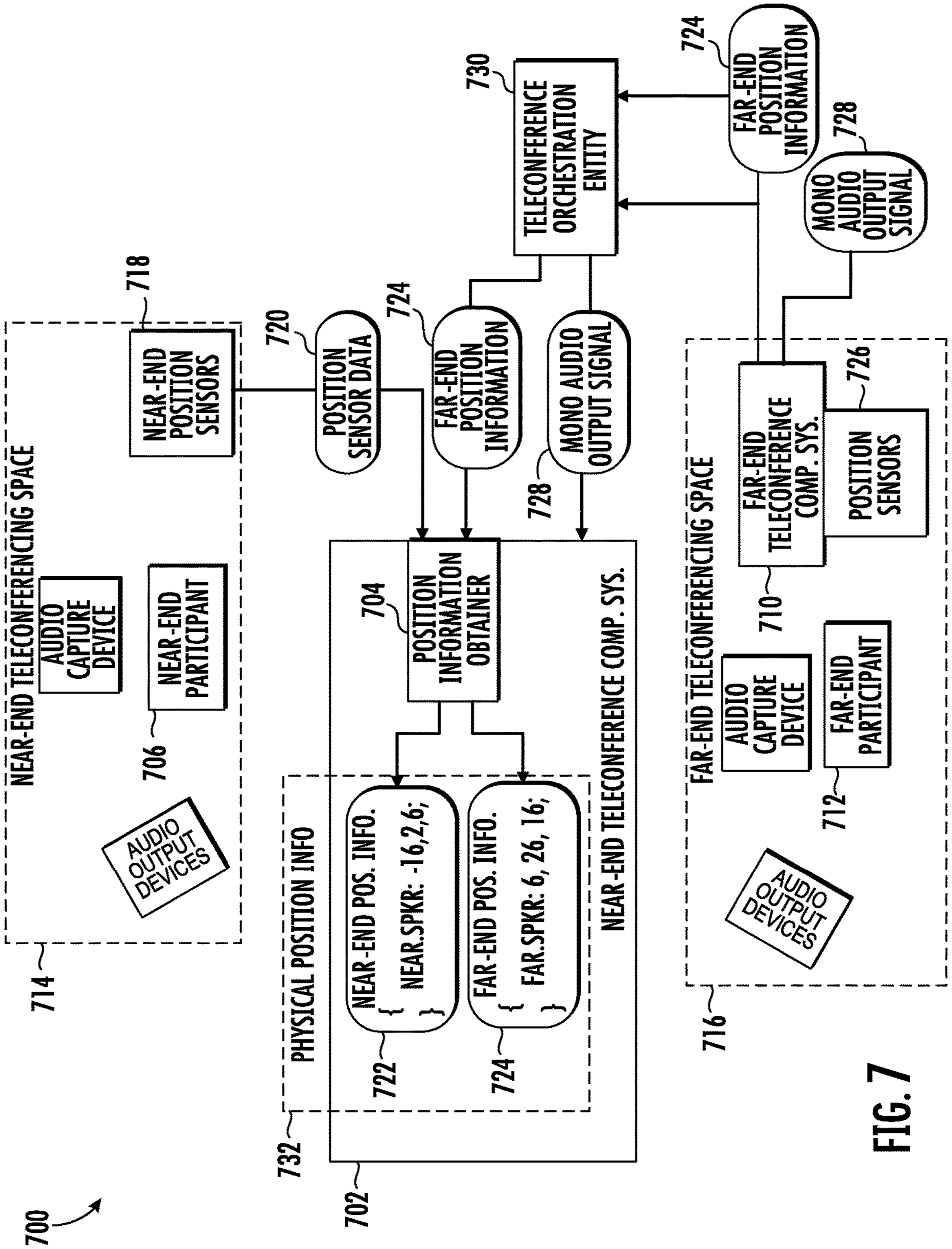
FIG. 7 is a data flow diagram for obtaining physical position information from near-end and far-end participants according to some implementations of the present disclosure.

FIG. 7 is a data flow diagram for obtaining physical position information from near-end and far-end participants according to some implementations of the present disclosure. More specifically, teleconference computing system 702 can include a position information obtainer 704. The position information obtainer 704 can obtain position information in the same manner as previously described with regards to position information obtainer 412 of FIG. 4.

Generally, in telecommunications, a participant associated with a teleconference computing system that is receiving an audio output signal is referred to as a "near-end" participant (e.g., a participant who is listening to another participant speak). Conversely, the participant that is providing the audio output signal is referred to as a "far-end" participant (e.g., a participant actively broadcasting spoken utterances). As depicted, participant 706 is referred to as a "near-end" participant 706 because the teleconference computing system 702, which is associated with the near-end participant 706, is receiving a mono audio output signal 708 from a "far-end" teleconference computing system 710 that is associated with a "far-end" participant 712. Similarly, teleconferencing space 714 is referred to as a "near-end" teleconferencing space 714 because the "near-end" participant 706 is located within it, and teleconferencing space 716 is referred to as a "far-end" teleconferencing space 716 because the far-end participant 712 is located within it.

More specifically, in some implementations of the present disclosure, the utilization of position information that indicates the positions of both the near-end participant 706 within the near-end teleconferencing space 714 and the far-end participant 712 within the far-end teleconferencing space 716 can further optimize performance of AEC processes.

For example, the near-end teleconferencing space can include near-end position sensors 718. The near-end position sensors 718 can provide position sensor data 720 to the position information obtainer 704, and the position obtainer 704 can analyze the position sensor data 720 as described with regards to FIG. 2 to obtain near-end position information 722. The far-end teleconference computing system 710 can obtain far-end position information 724 in a similar manner using far-end position sensors 726. The far-end teleconference computing system 710 can provide the far-end position information 724 and a mono audio output signal 728 (e.g., including audio of a spoken utterance from the far-end participant 712, etc.) to a teleconference orchestration entity 730.

The position information obtainer 704 can obtain the far-end position information 724 from the teleconference orchestration entity. Both the near-end position information 722 and the far-end position information 724 can be included in physical position information 732. In such fashion, the NEAR-END teleconference computing system (e.g., teleconference computing system 202 101 of FIG. 1, 202 of FIG. 2, etc.) can obtain physical position information 732 that indicates both a position of the participant within the teleconferencing space and another participant within a separate teleconferencing space associated with the stereo audio output signal.

Figure 8:
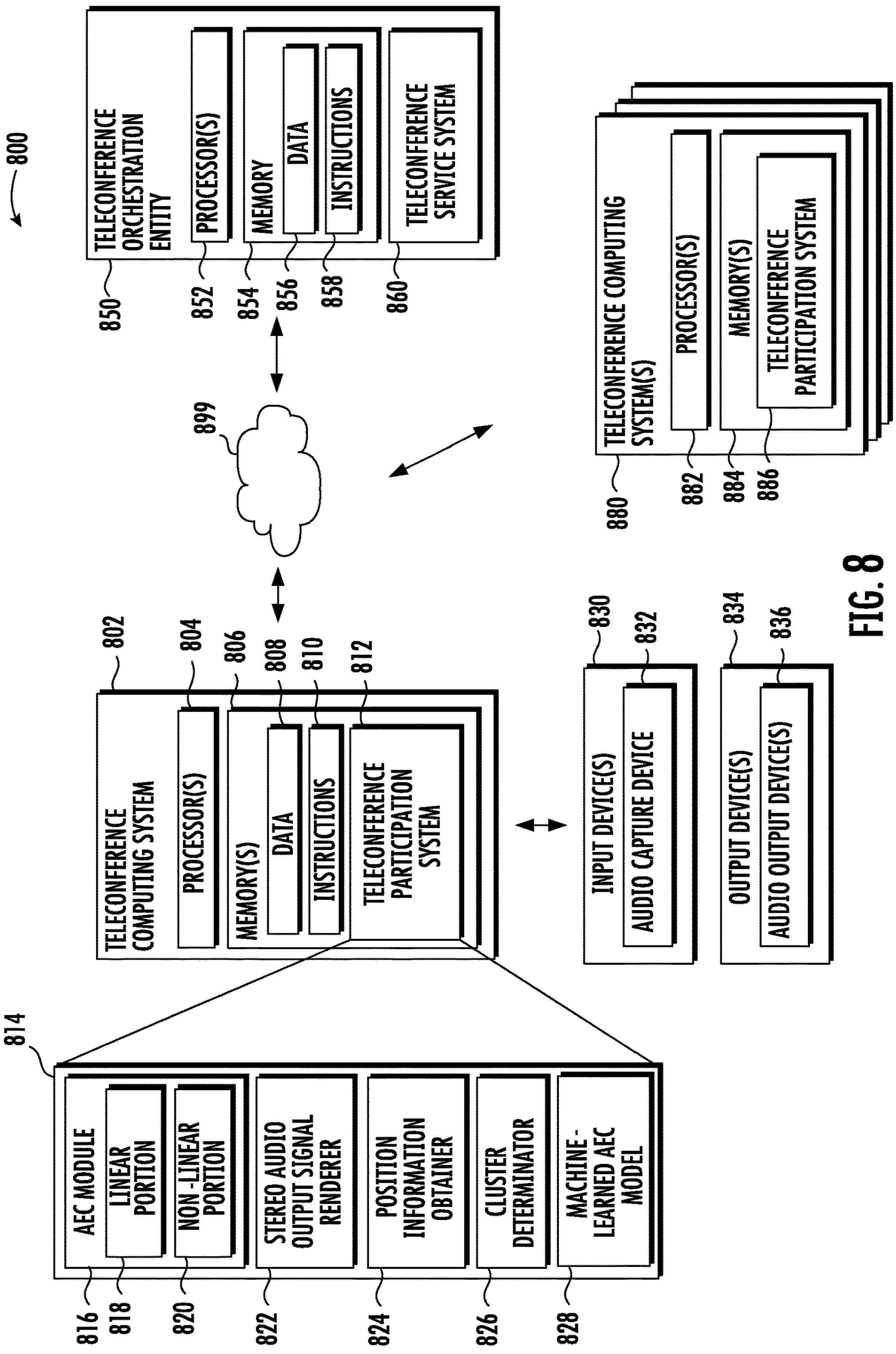
FIG. 8 depicts a block diagram of an example computing environment that performs minimization of echo caused by stereo audio via position-sensitive acoustic echo cancellation according to example implementations of the present disclosure.

FIG. 8 depicts a block diagram of an example computing environment 800 that performs minimization of echo caused by stereo audio via position-sensitive acoustic echo cancellation according to example implementations of the present disclosure. The computing environment 800 includes a teleconferencing computing system 802 that is associated with a participant in a teleconference, a teleconference orchestration system 850, and, in some implementations, other teleconferencing computing system(s) 880 respectively associated with other participants(s) in the teleconference.

The teleconferencing computing system 802 can be any type of computing device, such as, for example, a personal computing device (e.g., laptop or desktop), a mobile computing device (e.g., smartphone or tablet), a gaming console or controller, a wearable computing device (e.g., an virtual/augmented reality device, etc.), an embedded computing device, a broadcasting computing device (e.g., a webcam, etc.), etc.

In particular, the teleconferencing computing system 802 can, in some implementations, be a computing system for managing acoustic echo cancellation for multiple teleconferencing peripheral devices within multiple teleconferencing spaces. For example, the teleconferencing computing system 802 can handle computing for 8 separate teleconferencing spaces (e.g., teleconferencing booths, etc.). Each teleconferencing space can include multiple teleconferencing peripherals (e.g., audio capture devices, audio output devices, video capture/output device(s), etc.). The teleconferencing computing system 802 can perform AEC procedures for audio input streams captured at each of the 8 separate teleconferencing spaces by the teleconferencing peripherals according to implementations of the present disclosure.

The teleconferencing computing system 802 includes processor(s) 804 and memory(s) 806. The processor(s) 804 can be any suitable processing device (e.g., a processor core, a microprocessor, an ASIC, an FPGA, a controller, a microcontroller, etc.) and can be one processor or processors that are operatively connected. The memory 806 can include non-transitory computer-readable storage media(s), such as RAM, ROM, EEPROM, EPROM, flash memory devices, magnetic disks, etc., and combinations thereof. The memory 806 can store data 808 and instructions 810 which are executed by the processor 804 to cause the teleconference computing system 802 to perform operations.

In particular, the memory 806 of the teleconference computing system 802 can include a teleconference participation system 812. The teleconference participation system 812 can facilitate participation in a teleconference by a participant associated with the teleconference computing system 802 (e.g., a teleconference orchestrated by teleconference orchestration system 850, etc.). To facilitate teleconference participation, the teleconference participation system 812 can include service module(s) 814 which fulfill various teleconferencing services that collectively allow a participant to participate in a teleconference.

For example, the teleconference service module(s) 814 can include an AEC module 816. The AEC module 816 can perform AEC procedures for audio input streams. In particular, the AEC module 816 can include a linear portion 818 and a non-linear portion 820. The linear portion 818 and non-linear portion 820 can successively process an audio input stream to remove linear echo audio and non-linear echo audio from the audio input stream, therefore optimizing the quality of the audio input stream.

For another example, the teleconference service module(s) 814 can include stereo audio output signal renderer 822. The stereo audio output signal renderer 822 can generate a stereo audio output signal. In particular, the stereo audio output signal renderer 822 can render a stereo audio output signal from a mono audio output signal (e.g., a synthetic stereo audio output signal, etc.).

For another example, the teleconference service module(s) 814 can include a position information obtainer 824. The position information obtainer 824 can obtain position information that indicates the position of a participant (e.g., a participant associated with teleconference computing system 802) relative to audio output devices (e.g., audio output devices 834 within a teleconferencing space). For example, the position information obtainer 824 can obtain physical position information that describes a physical position of audio output devices relative to a participant located within a physical, three-dimensional teleconferencing space. For another example, the position information obtainer 824 can obtain virtual position information that indicates a virtual position of a representation of the participant relative to virtual positions of representations of other participants within a virtual teleconferencing environment.

For another example, the teleconference service module(s) 814 can include a cluster determinator 826. The cluster determinator 826 can determine a cluster to which position information (e.g., obtained using position information obtainer 824) is to be assigned. More specifically, the memory(s) 806 can include a clustering space in which position information (or intermediate representations of position information, such as embeddings) can be clustered. Each of the clusters can be associated with an estimation of the processing performance of the linear portion 818. The estimation of the performance of the linear portion 818 can be selected based on the assignment of the position information by the cluster determinator 826, and can be provided to the non-linear portion 820 to more effectively suppress echo in the audio input signal.

For yet another example, the teleconference service module(s) 814 can store or include a machine-learned AEC model 828. The machine-learned AEC model 828 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multiheaded self-attention models (e.g., transformer models). In particular, the machine-learned AEC model 828 can be trained to perform AEC processes as described with regards to FIG. 3.

In some implementations, the machine-learned AEC model 828 can be received from the teleconference orchestration entity 850 over network 899, stored in the memory(s) 806, and then used or otherwise implemented by the processor(s) 804. In some implementations, the teleconference computing system 802 can implement multiple parallel instances of a single machine-learned AEC model 828 (e.g., to perform parallel AEC processes across multiple instances of the machine-learned AEC model 828).

The teleconference computing system 802 can also include input device(s) 830 that receive inputs from a participant, or otherwise capture data associated with a participant. For example, the input device(s) 830 can include a touch-sensitive device (e.g., a touch-sensitive display screen or a touch pad) that is sensitive to the touch of a participant input object (e.g., a finger or a stylus). The touch-sensitive device can serve to implement a virtual keyboard. Other example participant input components include a microphone, a traditional keyboard, or other means by which a participant can provide user input.

In some implementations, the teleconference computing system can include, or can be communicatively coupled, input device(s) 830. For example, the input device(s) 830 can include a camera device that can capture two-dimensional video data of a participant associated with the teleconference computing system 802 (e.g., for broadcasting, etc.). In some implementations, the input device(s) 830 can include a number of camera devices communicatively coupled to the teleconference computing system 802 that are configured to capture image data from different perspectives for generation of three-dimensional pose data/representations (e.g., a representation of a user of the teleconference computing system 802, etc.).

In particular, the input device(s) 830 can include audio capture devices 832, such as microphones. For example, the audio capture device(s) 832 can be, or otherwise include, a microphone array that captures high-quality audio data and provides the data as an audio input signal. For another example, the audio capture device(s) 832 can be a directional microphone that captures audio and a direction from which the audio was captured.

In some implementations, the input device(s) 830 can include sensor devices configured to capture sensor data indicative of movements of a participant associated with the teleconference computing system 802 (e.g., accelerometer(s), Global Positioning Satellite (GPS) sensor(s), gyroscope(s), infrared sensor(s), head tracking sensor(s) such as magnetic capture system(s), an omni-directional treadmill device, sensor(s) configured to track eye movements of the user, etc.). In particular, the input device(s) 830 can include position sensor(s) that can capture sensor data. The positioning data can indicate a position of a participant within a teleconferencing space. For example, the input device(s) 830 can be a pressure sensor, infrared sensor, LIDAR sensor, etc. positioned within the teleconferencing space.

In some implementations, the teleconference computing system 802 can include, or be communicatively coupled to, output device(s) 834. Output device(s) 834 can be, or otherwise include, device(s) configured to output audio data, image data, video data, etc. For example, the output device(s) 834 can include a two-dimensional display device (e.g., a television, projector, smartphone display device, etc.). For another example, the output device(s) 834 can include display devices for an augmented reality device or virtual reality device.

In particular, the output device(s) 834 can include audio output device(s) 836. The audio output device(s) 836 can be any type or manner of audio device that can create, or otherwise simulate, stereo audio. For example, the audio output device(s) 836 can be a wearable audio output device (e.g., wired or wireless headphones, earbuds, bone conduction headphones, portable stereo simulation speakers, etc.). For another example, the audio output device(s) 836 can be multiple discrete audio output devices within a single audio output device (e.g., a soundbar device that simulates stereo audio). For yet another example, the audio output device(s) 836 can be separate audio output devices that produce stereo audio (e.g., multiple networked passive speakers, a wireless mesh speaker setup, etc.).

The teleconference orchestration entity 850 includes processor(s) 852 and a memory 854. The processor(s) 852 can be any suitable processing device (e.g., a processor core, a microprocessor, an ASIC, an FPGA, a controller, a microcontroller, etc.) and can be one processor or processors that are operatively connected. The memory 854 can include non-transitory computer-readable storage media(s), such as RAM, ROM, EEPROM, EPROM, flash memory devices, magnetic disks, etc., and combinations thereof. The memory 854 can store data 856 and instructions 858 which are executed by the processor 852 to cause the teleconference orchestration entity 850 to perform operations.

Specifically, the teleconference orchestration entity 850 can be any type, manner, or combination of computing device(s) and/or system(s). In some implementations, the teleconference orchestration entity 850 can be, or otherwise include, a virtual machine or containerized unit of software instructions executed within a virtualized cloud computing environment (e.g., a distributed, networked collection of processing devices), and can be instantiated in response to a request to initiate a teleconference. Additionally, or alternatively, the teleconference orchestration entity 850 can be, or otherwise include, physical processing devices, such as processing nodes within a cloud computing network (e.g., nodes of physical hardware resources).

The teleconference orchestration entity 850 can facilitate communications within a teleconference using the teleconference service system 860. More specifically, the teleconference orchestration entity 850 can utilize the teleconference service system 860 to encode, broadcast, and/or relay communications signals (e.g., audio input signals, video input signals, etc.), host chat rooms, relay teleconference invites, provide web applications for participation in a teleconference (e.g., a web application accessible via a web browser at a teleconference computing system, etc.), etc.

More generally, the teleconference orchestration entity 850 can utilize the teleconference service system 860 to handle any frontend or backend services necessary to provide a teleconference. For example, the teleconference service system 860 can receive and broadcast (i.e., relay) data (e.g., video data, audio data, etc.) between the teleconference computing system 802 and teleconference computing system(s) 880. A teleconferencing service can be any type of application or service that receives and broadcasts data from multiple participants. For example, in some implementations, the teleconferencing service can be a videoconferencing service that receives data (e.g., audio data, video data, both audio and video data, etc.) from some participants and broadcasts the data to other participants.

As an example, the teleconference service system 860 can provide a videoconference service for multiple participants. One of the participants can transmit audio and video data to the teleconference service system 860 using a participant device (e.g., teleconference computing system 802, etc.). A different participant can transmit audio data to the teleconference service system 860 with a different teleconference computing system. The teleconference service system 860 can receive the data from the participants and broadcast the data to each computing system.

As another example, the teleconference service system 860 can implement an augmented reality (AR) or virtual reality (VR) conferencing service for multiple participants. One of the participants can transmit AR/VR data sufficient to generate a three-dimensional representation of the participant to the teleconference service system 860 via a device (e.g., video data, audio data, sensor data indicative of a pose and/or movement of a participant, etc.). The teleconference service system 860 can transmit the AR/VR data to devices of the other participants. In such fashion, the teleconference service system 860 can facilitate any type or manner of teleconferencing services to multiple participants.

It should be noted that the teleconference service system 860 can facilitate the flow of data between participants (e.g., teleconference computing system 802, teleconference computing system(s) 880, etc.) in any manner that is sufficient to implement the teleconference service. In some implementations, the teleconference service system 860 can be configured to receive data from participants, decode the data, encode the data, broadcast the data to other participants, etc. For example, the teleconference service system 860 can receive encoded video data from the teleconference computing system 802. The teleconference service system 860 can decode the video data according to a video codec utilized by the teleconference computing system 802. The teleconference service system 860 can encode the video data with a video codec and broadcast the data to participant computing devices.

In some implementations, the teleconference orchestration entity 850 includes, or is otherwise implemented by, server computing device(s). In instances in which the teleconference orchestration entity 850 includes multiple server computing devices, such server computing devices can operate according to sequential computing architectures, parallel computing architectures, or some combination thereof.

In some implementations, the teleconference orchestration entity 850 can receive data of various types from the teleconference computing system 802 and the teleconference computing system(s) 880 (e.g., via the network 899, etc.). For example, in some implementations, the teleconference computing system 802 can capture video data, audio data, multimedia data (e.g., video data and audio data, etc.), sensor data, etc. and transmit the data to the teleconference orchestration entity 850. The teleconference orchestration entity 850 can receive the data (e.g., via the network 899).

In some implementations, the teleconference orchestration entity 850 can receive data from the teleconference computing system(s) 802 and 880 according to various encryption scheme(s) (e.g., codec(s), lossy compression scheme(s), lossless compression scheme(s), etc.). For example, the teleconference computing system 802 can encode audio data with an audio codec, and then transmit the encoded audio data to the teleconference orchestration entity 850. The teleconference orchestration entity 850 can decode the encoded audio data with the audio codec. In some implementations, the teleconference computing system 802 can dynamically select between a number of different codecs with varying degrees of loss based on conditions of the network 899, the teleconference computing system 802, and/or the teleconference orchestration entity 850. For example, the teleconference computing system 802 can dynamically switch from audio data transmission according to a lossy encoding scheme to audio data transmission according to a lossless encoding scheme based on a signal strength between the teleconference computing system 802 and the network 899.

Additionally, or alternatively, in some implementations, the teleconference service system 860 can facilitate peer-to-peer teleconferencing services between participants. For example, in some implementations, the teleconference service system 860 can dynamically switch between provision of server-side teleconference services and facilitation of peer-to-peer teleconference services based on various factors (e.g., network load, processing load, requested quality, etc.).

The teleconference computing system 802 can receive data broadcast from the teleconference service system 860 of teleconference orchestration entity 850 as part of a teleconferencing service (video data, audio data, etc.). In some implementations, the teleconference computing system 802 can upscale or downscale the data (e.g., video data) based on a role associated with the data. For example, the data can be video data associated with a participant of the teleconference computing system 802 that is assigned an active speaker role. The teleconference computing system 802 can upscale the video data associated with the participant in the active speaker role for display in a high-resolution display region (e.g., a region of the output device(s) 834). For another example, the video data can be associated with a participant with a non-speaker role. The teleconference computing system 802 can downscale the video data associated with the participant in the non-speaker role using a downscaling algorithm (e.g., lanczos filtering, Spline filtering, bilinear interpolation, bicubic interpolation, etc.) for display in a low-resolution display region. In some implementations, the roles of participants associated with video data can be signaled to computing devices (e.g., teleconference computing system 802, teleconference computing system(s) 880, etc.) by the teleconference service system 860 of the teleconference orchestration entity 850.

The teleconference orchestration entity 850 and the teleconference computing system 802 can communicate with the teleconference computing system(s) 880 via the network 899. The teleconference computing system(s) 880 can be any type of computing device(s), such as, for example, a personal computing device (e.g., laptop or desktop), a mobile computing device (e.g., smartphone or tablet), a gaming console or controller, a wearable computing device (e.g., an virtual/augmented reality device, etc.), an embedded computing device, a broadcasting computing device (e.g., a webcam, etc.), or any other type of computing device.

The teleconference computing system(s) 880 includes processor(s) 882 and a memory 884 as described with regards to the teleconference computing system 802. Specifically, the teleconference computing system(s) 880 can be substantially similar to, or identical to, the teleconference computing system 802. For example, the teleconference computing system(s) 880 can each include a teleconference participation system 886 that includes at least some of the modules 816-828 of the teleconference participation system 812 of teleconference computing system 802. For another example, the teleconference computing system(s) 880 may include, or may be communicatively coupled to, the same type of input and output devices as described with regards to input device(s) 830 and output device(s) 834 (e.g., audio capture device 832, audio output device(s) 836, etc.). Alternatively, in some implementations, the teleconference computing system(s) 880 can be different devices than the teleconference computing system 802, but can also facilitate teleconferencing with the teleconference orchestration entity 850. For example, the teleconference computing system 802 can be a laptop and the teleconference computing system(s) 880 can be smartphone(s).

In some implementations, the teleconference computing system(s) 880 can be associated with other participants of the teleconference, and can facilitate participation in the teleconference in a manner similar to that of teleconference computing system 802. In some implementations, the teleconference computing system(s) 880 can be, or include, a far-end teleconference computing system 880. A far-end teleconference computing system generally refers to a computing system that is providing an audio output signal to another teleconference computing system. For example, the far-end teleconference computing system 880 can capture an audio input signal (e.g., including audio of a spoken utterance from an associated participant, etc.), and can also obtain far-end position information that indicates a position of the associated participant within a teleconferencing space (e.g., using a position information obtainer in the teleconference participation system 886, etc.). The far-end teleconference computing system 880 can provide the audio input signal to the teleconference computing system 802 as an audio output signal and can also provide the far-end position information to the teleconference computing system 802.

The teleconference computing system 802 can receive the far-end position information, and can obtain its own "near-end" position information with the position information obtainer 824 (e.g., information that indicates a position of the participant associated with teleconference computing system 802). By obtaining both near-end and far-end position information, the teleconference computing system 802 can further enhance the effectiveness of the AEC module 816 and the non-linear portion 820 in particular.

The network 899 can be any type of communications network, such as a local area network (e.g., intranet), wide area network (e.g., Internet), or some combination thereof and can include any number of wired or wireless links. In general, communication over the network 899 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

The following definitions provide a detailed description of various terms discussed throughout the subject specification. As such, it should be noted that any previous reference in the specification to the following terms should be understood in light of these definitions.

Cloud: as used herein, the term "cloud" or "cloud computing environment" generally refers to a network of inter-connected computing devices (e.g., physical computing devices, virtualized computing devices, etc.) and associated storage media which interoperate to perform computational operations such as data storage, transfer, and/or processing. In some implementations, a cloud computing environment can be implemented and managed by an information technology (IT) service provider. The IT service provider can provide access to the cloud computing environment as a service to various users, who can in some circumstances be referred to as "cloud customers."

Participant: as used herein, the term "participant" generally refers to any user (e.g., human user), virtualized user (e.g., a bot, etc.), or group of users that participate in a live exchange of data (e.g., a teleconference such as a videoconference, etc.). More specifically, participant can be used throughout the subject specification to refer to user(s) within the context of a teleconference. As an example, a group of participants can refer to a group of users that participate remotely in a teleconference with their own participant computing devices (e.g., smartphones, laptops, wearable devices, teleconferencing devices, broadcasting devices, etc.). As another example, a participant can refer to a group of users utilizing a single participant computing device for participation in a teleconference (e.g., a videoconferencing device within a meeting room, etc.). As yet another example, participant can refer to a bot or an automated user (e.g., a virtual assistant, etc.) that participates in a teleconference to provide various services or features for other participants in the teleconference (e.g., recording data from the teleconference, providing virtual assistant services, providing testing services, etc.)

Teleconference computing system/Participant computing device: in some implementations, the teleconference computing system(s) described herein may be, or otherwise include, participant computing device(s). The term "participant computing device" generally refers to any device that is used to participate in a teleconference. As examples, a participant computing device can be a smartphone, a laptop computer, a desktop computer, a tablet, a wearable computing device, an AR/VR computing device, a teleconferencing computing device, a camera, a microphone, etc. A participant computing device can be considered to be participating in a teleconference if the participant computing device is currently maintaining some manner of connection to a teleconferencing session (e.g., transmitting and/or receiving communications data, etc.) or has recently maintained a connection to the teleconferencing session (e.g., a device experiencing a temporary disruption to its connection to a teleconferencing session).

Teleconference: as used herein, the term "teleconference" generally refers to any communication or live exchange of data (e.g., audio data, video data, AR/VR data, etc.) between multiple participant computing devices. The term "teleconference" encompasses a videoconference, an audioconference, a media conference, an Augmented Reality (AR)/Virtual Reality (VR) conference, and/or other forms of the exchange of data (e.g., communications data) between participant computing devices. As an example, a teleconference can refer to a videoconference in which multiple participant computing devices broadcast and/or receive video data and/or audio data in real-time or near real-time. As another example, a teleconference can refer to an AR/VR conferencing service in which AR/VR data (e.g., pose data, image data, positioning data, audio data, etc.) sufficient to generate a three-dimensional representation of a participant is exchanged amongst participant computing devices in real-time. As yet another example, a teleconference can refer to a conference in which audio signals are exchanged amongst participant computing devices over a mobile network. As yet another example, a teleconference can refer to a media conference in which one or more different types or combinations of media or other data are exchanged amongst participant computing devices (e.g., audio data, video data, AR/VR data, a combination of audio and video data, etc.)

While the present subject matter has been described in detail with respect to various specific example implementations thereof, each example is provided by way of explanation, not limitation of the disclosure. Those skilled in the art, upon attaining an understanding of the foregoing, can readily produce alterations to, variations of, and equivalents to such implementations. Accordingly, the subject disclosure does not preclude inclusion of such modifications, variations and/or additions to the present subject matter as would be readily apparent to one of ordinary skill in the art. For instance, features illustrated or described as part of one implementation can be used with another implementation to yield a still further implementation. Thus, it is intended that the present disclosure cover such alterations, variations, and equivalents.

What is claimed is:

1. A computer-implemented method, comprising:

obtaining, by a teleconference computing system comprising one or more computing devices, a stereo audio output signal;

receiving, by the teleconference computing system, an audio input signal captured at an audio capture device located within a teleconferencing space, wherein at least a portion of the audio input signal comprises audio caused by playback of the stereo audio output signal by a plurality of audio output devices, wherein both the plurality of audio output devices and a participant of a teleconference are located within the teleconferencing space;

using, by the teleconference computing system, position information to perform an Acoustic Echo Cancellation (AEC) process to the at least the portion of the audio input signal, wherein the position information is indicative of a position of the participant of the teleconference relative to the plurality of audio output devices;

processing, by the teleconference computing system, the audio input signal with a linear portion of an AEC module of the teleconference computing system; and processing, by the teleconference computing system based on the position information, the audio input signal with a non-linear portion of the AEC module, comprising:

assigning, by the teleconference computing system, the position information to a first position cluster of a plurality of position clusters wherein the first position cluster is associated with a first linear portion performance estimate of a plurality of linear portion performance estimates respectively associated with the plurality of position clusters; and processing, by the teleconference computing system, the audio input signal with the non-linear portion of the AEC module based on the first linear portion performance estimate.

2. The computer-implemented method of claim 1, wherein obtaining the stereo audio output signal based on position information comprises:

generating, by the teleconference computing system, the stereo audio output signal based on the position information indicative of the position of the participant of the teleconference relative to the plurality of audio output devices, wherein both the participant and the plurality of audio output devices are located within the teleconferencing space; and causing, by the teleconference computing system, playback of the stereo audio output signal at the plurality of audio output devices located within the teleconferencing space.

3. The computer-implemented method of claim 1, wherein the method further comprises:

determining, by the teleconference computing system, a change in the position of the participant within the teleconferencing space relative to the plurality of audio output devices;

obtaining, by the teleconference computing system, second position information indicative of a second position of the participant relative to the plurality of audio output devices;

using, by the teleconference computing system, the second position information to render a second stereo audio output signal for playback at the plurality of audio output devices;

receiving, by the teleconference computing system, a second audio input signal captured at the audio capture device, wherein at least a portion of the second audio input signal comprises audio caused by playback of the second stereo audio output signal by the plurality of audio output devices;

assigning, by the teleconference computing system, the second position information to a second position cluster of the plurality of position clusters different than the first position cluster, wherein the second position cluster is associated with a second linear portion performance estimate; and processing, by the teleconference computing system, the second audio input signal with the non-linear portion of the AEC module based on the second linear portion performance estimate.

4. The computer-implemented method of claim 1, wherein assigning the position information to the first position cluster further comprises:

based on the position information, updating, by the teleconference computing system, the first linear portion performance estimate associated with the first position cluster.

5. The computer-implemented method of claim 4, wherein updating the first linear portion performance estimate comprises:

updating, by the teleconference computing system, the first linear portion performance estimate associated with the first position cluster according to a first learning rate; and updating, by the teleconference computing system, one or more other linear portion performance estimates of the plurality of linear portion performance estimates at a second learning rate lower than the first learning rate.

6. The computer-implemented method of claim 1, wherein each of the plurality of linear portion performance estimates comprises an Echo Return Loss Enhancement (ERLE) estimation.

7. The computer-implemented method of claim 1, wherein processing, based on the position information, the audio input signal with the non-linear portion of the AEC module comprises:

determining, by the teleconference computing system, that a difference between the position information and each of the plurality of position clusters is greater than a threshold degree of difference;

generating, by the teleconference computing system, a new position cluster and an associated linear portion performance estimate;

assigning, by the teleconference computing system, the position information to the new position cluster; and processing, by the teleconference computing system, the audio input signal with the non-linear portion of the AEC module based on the first linear portion performance estimate.

8. The computer-implemented method of claim 1, wherein using the position information to perform the AEC process comprises:

processing, by the teleconference computing system, the audio input signal and the position information with a machine-learned AEC model trained to perform the AEC process.

9. The computer-implemented method of claim 1, wherein the teleconference computing system comprises a participant computing device associated with the participant.

10. The computer-implemented method of claim 1, wherein generating the stereo audio output signal based on the position information comprises:

receiving, by the teleconference computing system, a mono audio output signal from a teleconference orchestration entity, wherein the mono audio output signal is generated at a second teleconference computing system associated with a second participant in the teleconference; and based on the position information, rendering, by the teleconference computing system, the stereo audio output signal from the mono audio output signal.

11. The computer-implemented method of claim 10, wherein, prior to generating the stereo audio output signal, the method comprises obtaining, by the teleconference computing system, the position information indicative of the position of the participant relative to the plurality of audio output devices.

12. The computer-implemented method of claim 11, wherein obtaining the position information indicative of the position of the participant relative to the plurality of audio output devices further comprises obtaining, by the computing system, second position information indicative of a position of the second participant within a second teleconferencing space different than the teleconferencing space.

13. The computer-implemented method of claim 1, wherein obtaining the stereo audio output signal comprises generating, by the teleconference computing system, the stereo audio output signal based on (a) the position information indicative of the position of the participant relative to the plurality of audio output devices, and (b) a teleconferencing role currently assigned to the participant and/or one or more additional participants of the teleconference.

14. The computer-implemented method of claim 1, wherein obtaining the stereo audio output signal comprises generating, by the teleconference computing system, the stereo audio output signal based on position information comprising physical position information and virtual position information, wherein:

the physical position information is indicative of a physical position of the participant relative to the plurality of audio output devices, wherein both the participant and the plurality of audio output devices are physically located within the teleconferencing space; and the virtual position information is indicative of a virtual position of a representation of the participant relative to virtual positions of representations of other participants within a virtual teleconferencing environment.

15. A teleconference computing system, comprising:

one or more processors; and one or more non-transitory computer-readable media that store instructions that, when executed by the one or more processors, cause the computing system to perform operations, the operations comprising:

obtaining position information, wherein the position information is indicative of a position of a first participant associated within a teleconferencing space, and a position of a second participant within a second teleconferencing space, wherein the first participant is associated with the teleconference computing system and the second participant is associated with a second teleconference computing system;

rendering, from a mono audio output signal from the second teleconference computing system, a stereo audio output signal based on the position information;

causing playback of the stereo audio output signal at a plurality of audio output devices located within the teleconferencing space;

receiving an audio input signal captured at an audio capture device located within the teleconferencing space, wherein at least a portion of the audio input signal comprises audio caused by playback of the stereo audio output signal by the plurality of audio output devices; and processing the audio output signal with a linear portion of an Acoustic Echo Cancellation (AEC) module;

processing the audio input signal with a non-linear portion of the AEC module by assigning the position information to a first position cluster of a plurality of position clusters, wherein the first position cluster is associated with a first linear portion performance estimate of a plurality of linear portion performance estimates respectively associated with the plurality of position clusters; and processing the audio input signal with the non-linear portion of the AEC module based on the first portion performance estimate.

16. The computing system of claim 15, wherein assigning the position information to the first position cluster further comprises the first position cluster further comprises:

based on the position information, updating the first linear portion performance estimate associated with the first position cluster, wherein updating the first linear portion performance estimate comprises:

updating the first linear portion performance estimate associated with the first position cluster according to a first learning rate; and updating one or more other linear portion performance estimates of the plurality of linear portion performance estimates at a second learning rate lower than the first learning rate.

17. One or more non-transitory computer-readable media that store instructions that, when executed by one or more processors of a teleconference computing system, cause the one or more processors to perform operations, the operations comprising:

obtaining a stereo audio output signal;

receiving an audio input signal captured at an audio capture device located within a teleconferencing space, wherein at least a portion of the audio input signal comprises audio caused by playback of the stereo audio output signal by a plurality of audio output devices, wherein both the plurality of audio output devices and a participant of a teleconference are located within the teleconferencing space;

using position information to perform an Acoustic Echo Cancellation (AEC) process to the at least the portion of the audio input signal, wherein the position information is indicative of a position of the participant of the teleconference relative to the plurality of audio output devices;

processing at least a portion of the audio input signal with a linear portion of an AEC module of the teleconference computing system;

processing, based on the position information, the audio input signal with a non-linear portion of the AEC module, comprising:

assigning the position information to a first position cluster of a plurality of position clusters wherein the first position cluster is associated with a first linear portion performance estimate of a plurality of linear portion performance estimates respectively associated with the plurality of position clusters; and processing the audio input signal with the non-linear portion of the AEC module based on the first linear portion performance estimate.

* * * * *